(12) United States Patent
Yamaguchi et al.

(10) Patent No.: US 7,000,842 B2
(45) Date of Patent: Feb. 21, 2006

(54) CARD-LIKE ELECTRONIC APPLIANCE HOLDER AND CARD-LIKE ELECTRONIC APPLIANCE SUPPORT APPARATUS

(75) Inventors: Akiko Yamaguchi, Aichi (JP); Kouji Hamada, Aichi (JP); Yoshihito Tamesue, Aichi (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 10/410,822

(22) Filed: Apr. 10, 2003

(65) Prior Publication Data

US 2003/0189101 A1 Oct. 9, 2003

Related U.S. Application Data

(62) Division of application No. 10/169,631, filed as application No. PCT/JP01/09805 on Nov. 9, 2001.

(30) Foreign Application Priority Data

Nov. 9, 2000 (JP) .......................... P2000-342589
Nov. 9, 2000 (JP) .......................... P2000-342590

(51) Int. Cl.
*G06K 7/00* (2006.01)
(52) U.S. Cl. ...................... 235/486; 235/483; 235/482; 235/435
(58) Field of Classification Search ................ 235/486, 235/483, 482, 435
See application file for complete search history.

(56) References Cited

U.S. PATENT DOCUMENTS 2,297,285 A * 9/1942 Bledsoe ...................... 40/634
3,216,136 A * 11/1965 Lang ............................ 40/653
5,038,926 A * 8/1991 van der Toorn ........... 206/39.3
5,500,517 A * 3/1996 Cagliostro ................... 235/486
5,959,281 A * 9/1999 Domiteaux ................. 235/454
6,112,996 A * 9/2000 Matsuo ....................... 235/492
6,422,469 B1 * 7/2002 Pernet ........................ 235/486
6,447,140 B1 * 9/2002 Lu ............................ 362/109
6,522,534 B1 * 2/2003 Wu ............................ 361/686
6,618,243 B1 * 9/2003 Tirosh ........................ 361/683

FOREIGN PATENT DOCUMENTS

JP 1-242293 A1 9/1989
JP 3017973 8/1995

(Continued)

*Primary Examiner*—Karl D. Frech
(74) *Attorney, Agent, or Firm*—Lerner, David, Littenberg, Krumholz & Mentlik, LLP

(57) ABSTRACT

The present invention holds a card-like electronic appliance, such as a semiconductor storage medium or an expansion module, and makes it difficult for dust, dirt and moisture to adhere to the card-like electronic appliance. The invention also makes it possible for card-like electronic appliances to be easily and appropriately held, stored, and organized, even when there are a large number of card-like electronic appliances. The card-like electronic appliance holder includes a holder main body with an appliance insertion hole into which at least part of a card-like electronic appliance is inserted, and is provided with a support part with a through-hole for hanging the holder main body. A convex part for engaging a concave part provided in the card-like electronic appliance and holding the card-like electronic appliance is provided inside the appliance insertion hole. Since card-like electronic appliances are held in this way, it becomes difficult for the card-like electronic appliances to become lost when kept separately, and dust, dirt, moisture, etc. can be kept from adhering to the card-like electronic appliance.

11 Claims, 27 Drawing Sheets

FOREIGN PATENT DOCUMENTS

| | | |
|---|---|---|
| JP | 9-173629 A1 | 7/1997 |
| JP | 10-65777 A1 | 3/1998 |
| JP | 10-307902 A1 | 11/1998 |
| JP | 11-110702 A1 | 4/1999 |
| JP | 3069380 | 3/2000 |
| JP | 2000-105811 A1 | 4/2000 |
| JP | 2001-67442 A1 | 3/2001 |
| JP | 2001-130072 A | 5/2001 |
| JP | 2001-307040 A1 | 11/2001 |
| JP | 2002-83276 A1 | 3/2002 |

\* cited by examiner

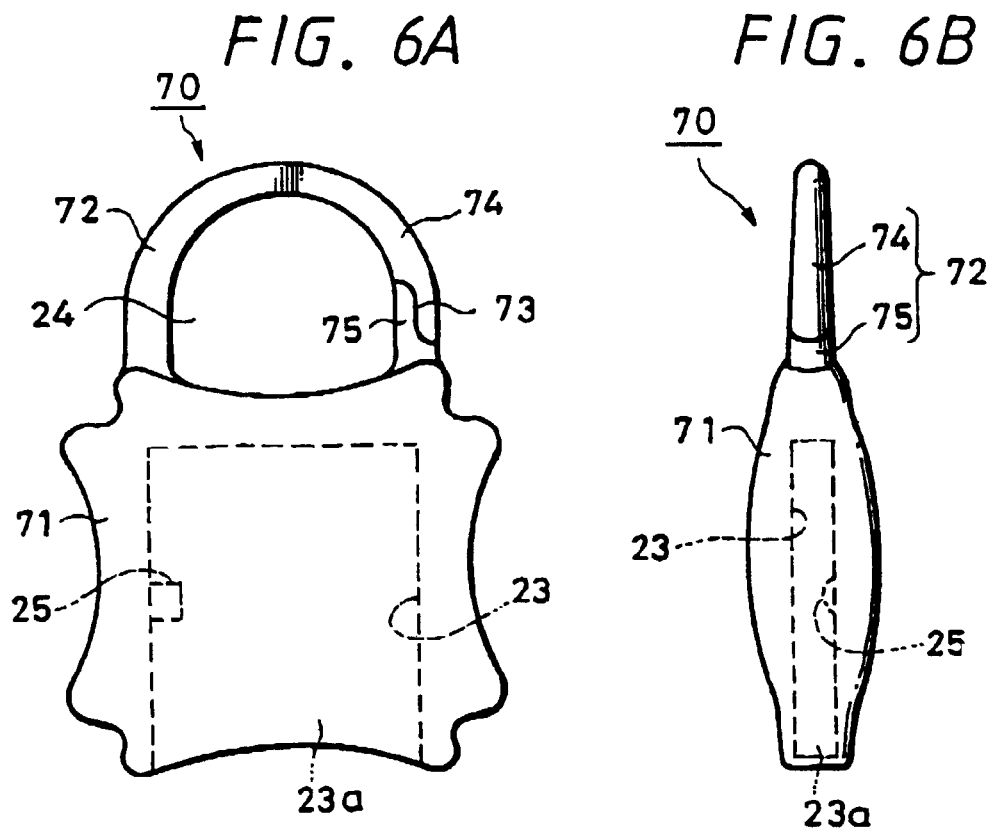
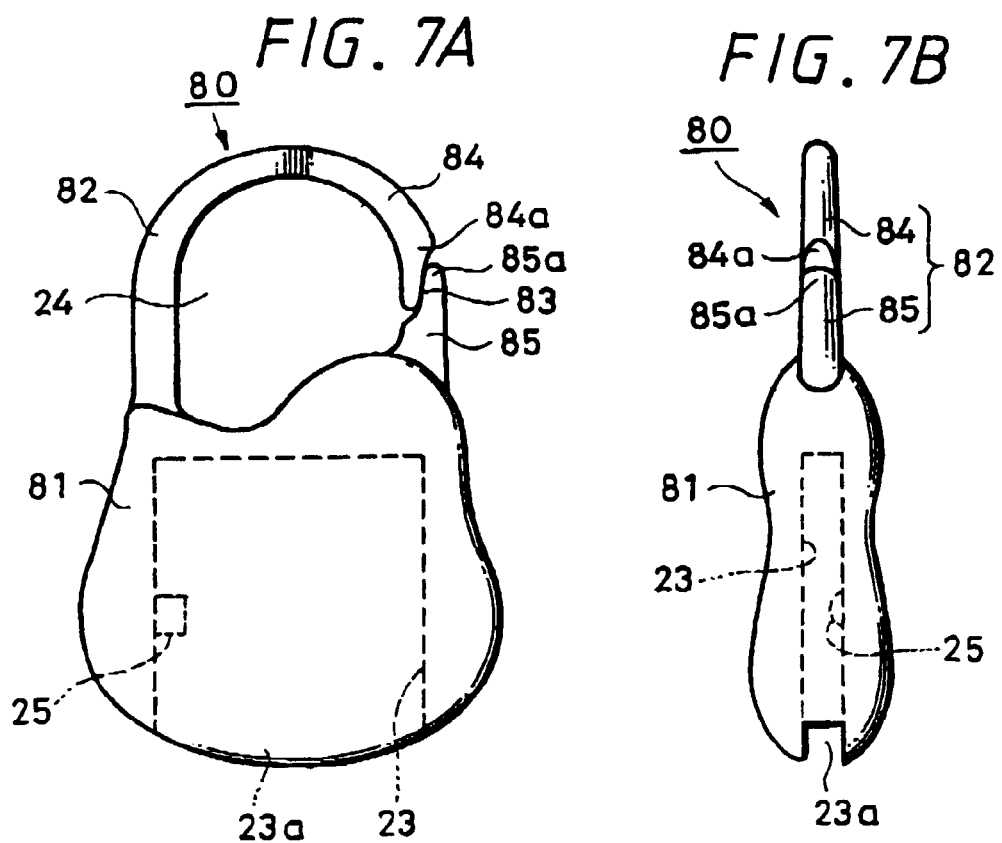

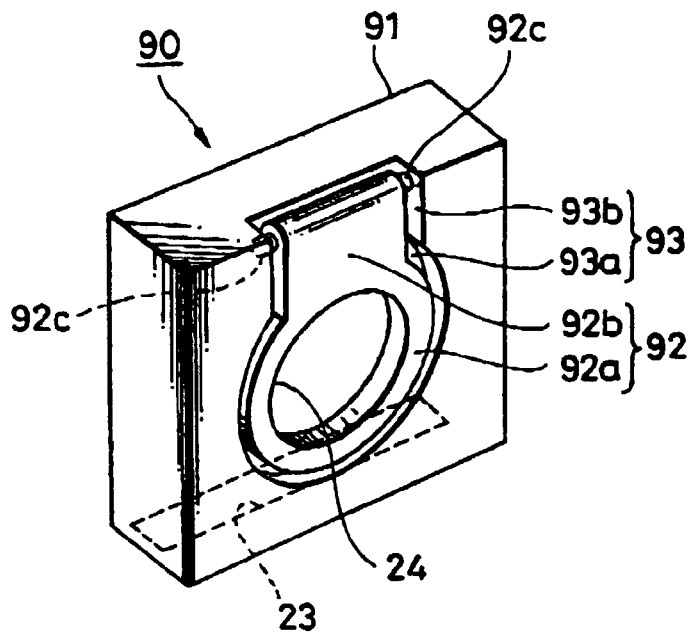
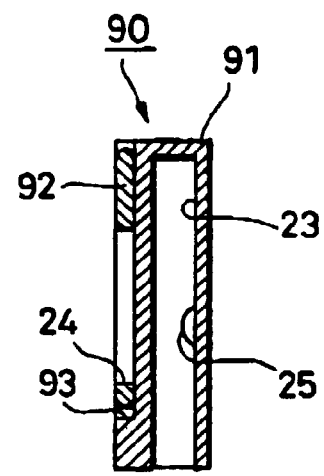
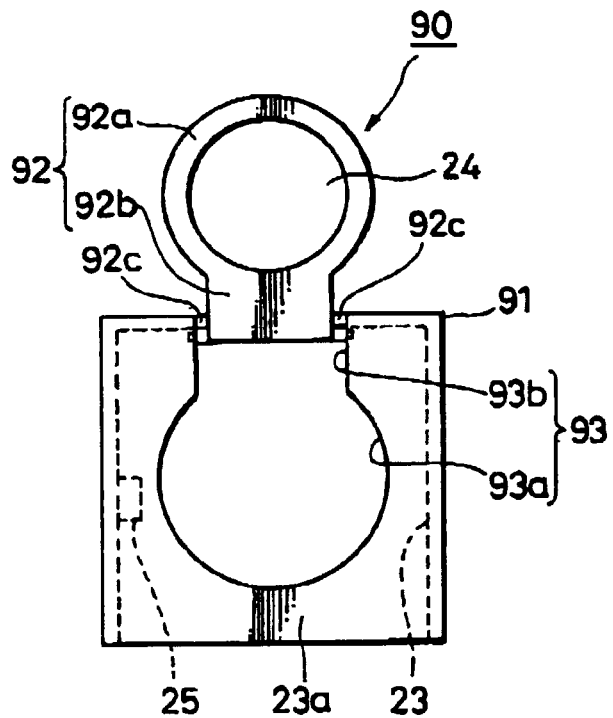
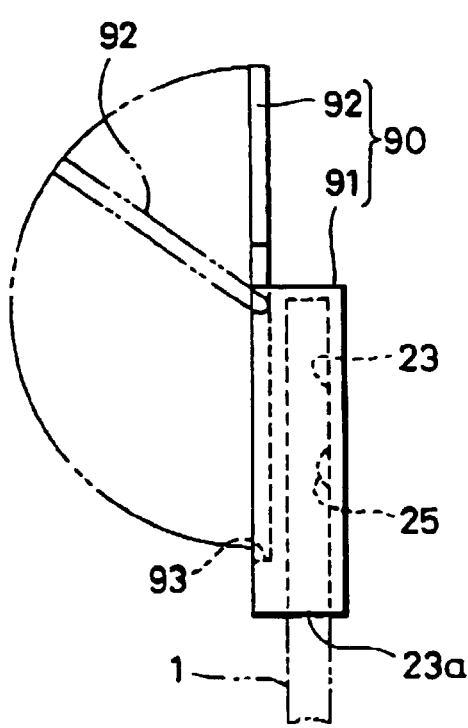

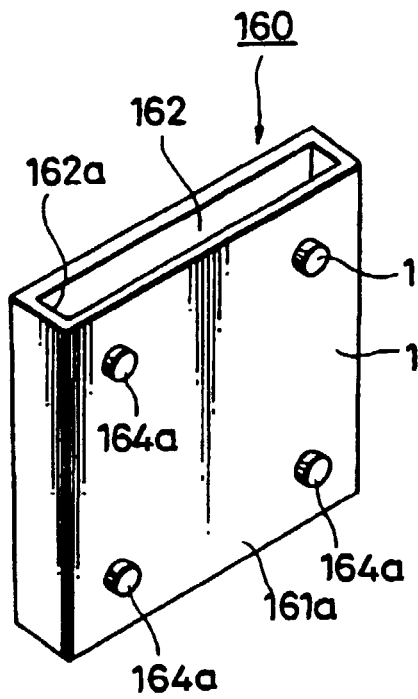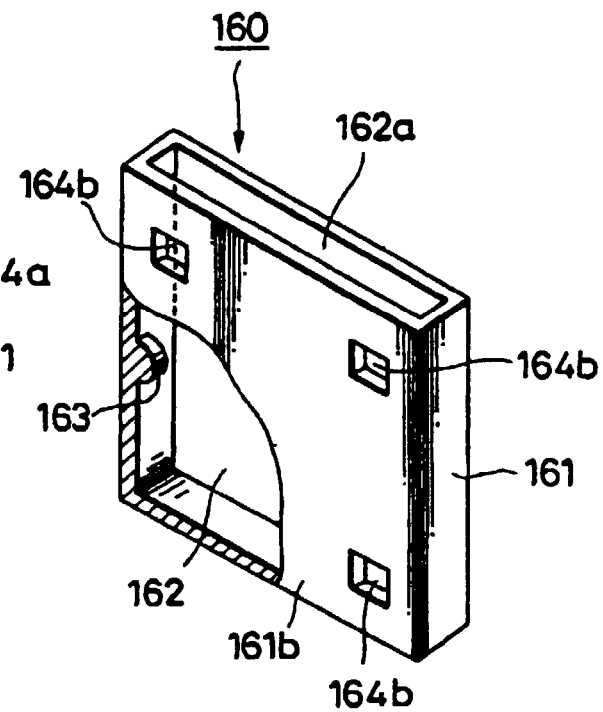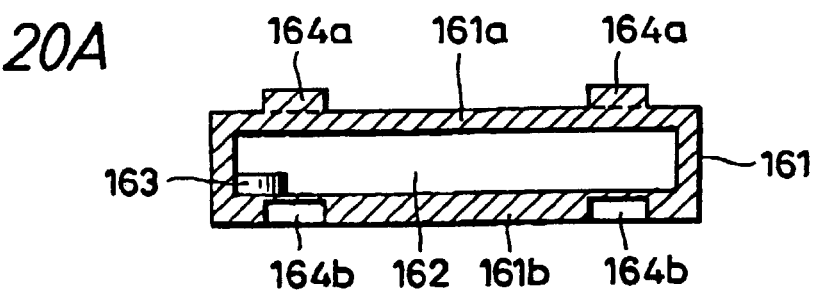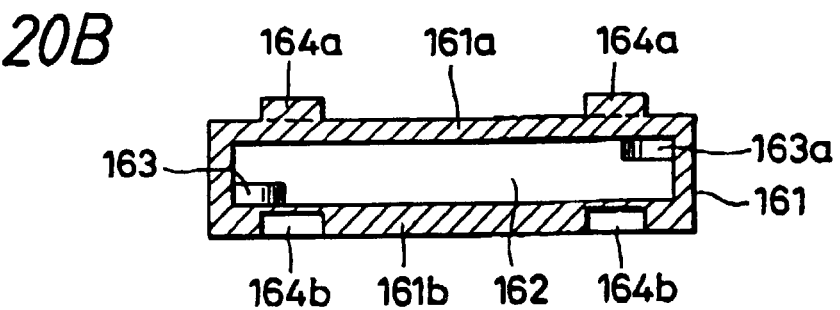

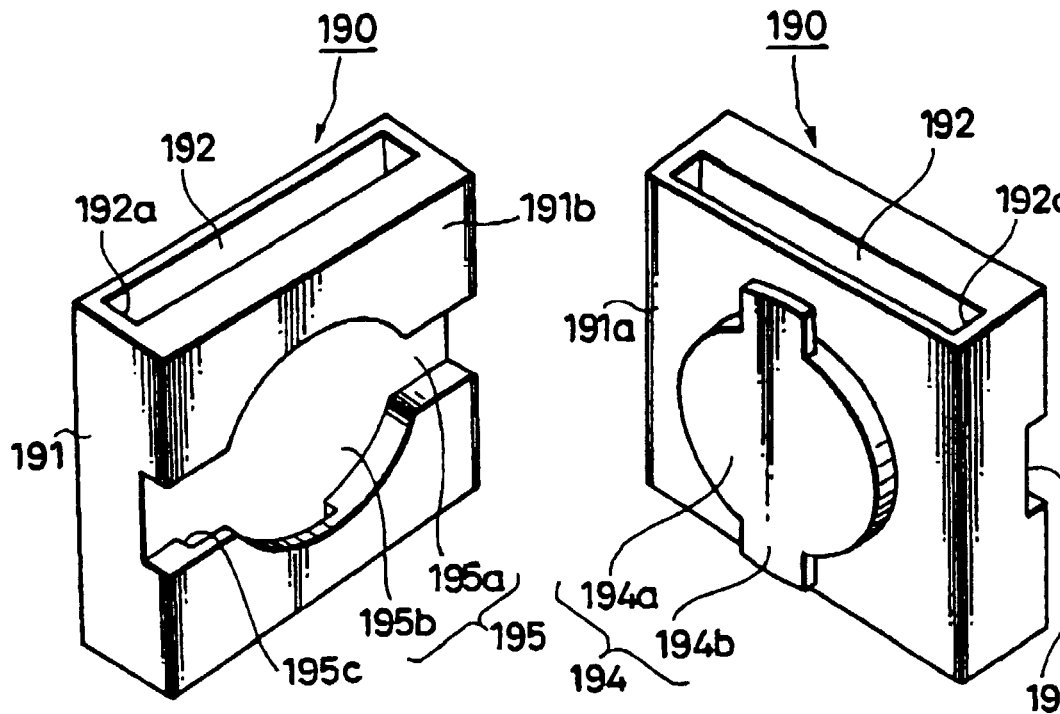
FIG. 29A
FIG. 29B
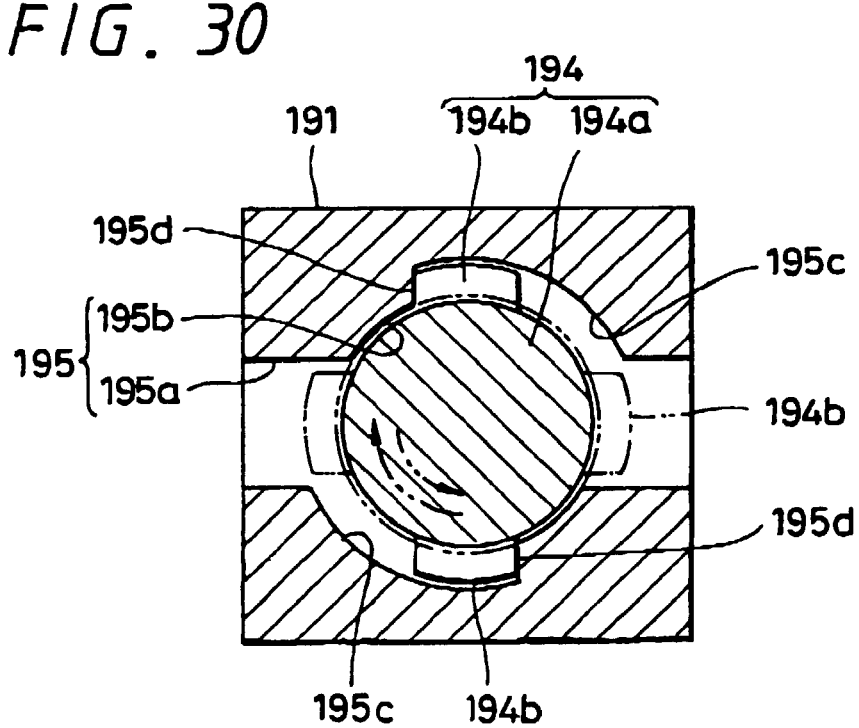
FIG. 30

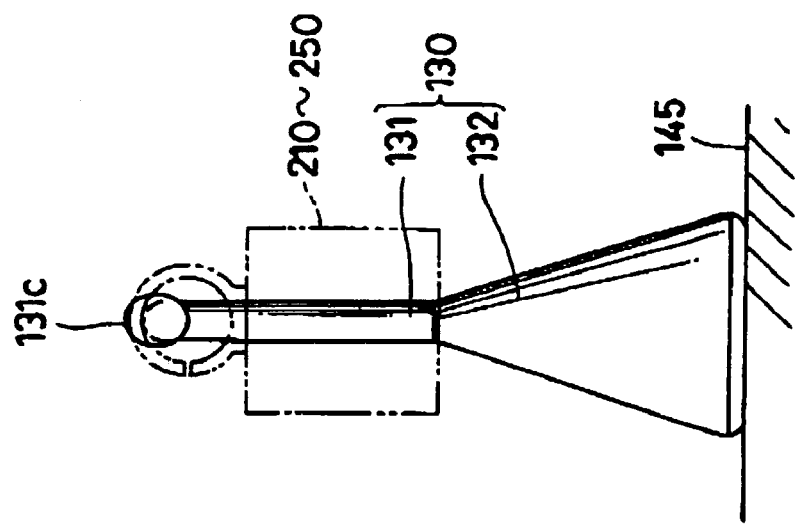
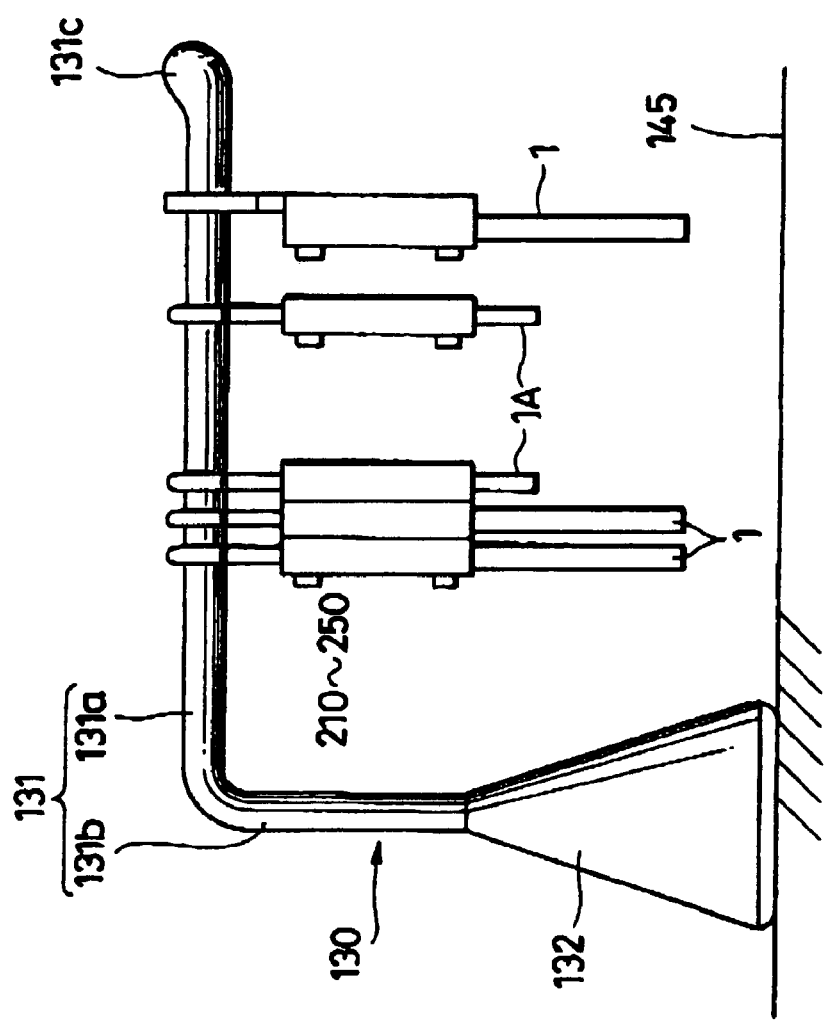
FIG. 41A
FIG. 41B

CARD-LIKE ELECTRONIC APPLIANCE HOLDER AND CARD-LIKE ELECTRONIC APPLIANCE SUPPORT APPARATUS

CROSS-REFERENCE TO RELATED APPLICATIONS

This application is a divisional application of the co-pending, commonly assigned, U.S. patent application Ser. No. 10/169,631, filed Oct. 4, 2002. This application is also a divisional of International Patent Application PCT/JP01/09805 designating the United States, filed Nov. 9, 2001. The disclosures of the above-mentioned applications are hereby incorporated by reference herein.

TECHNICAL FIELD

The present invention relates to a card-like electronic appliance holder that can hold a semiconductor storage medium called a "Memory Stick" in which a semiconductor memory such as a Flash EEPROM is enclosed in a board-like external case, a semiconductor storage medium called a "small PC card", or other card-like electronic appliances, and also to a convenient card-like electronic appliance support apparatus that is used for storing or organizing such card-like electronic appliance holders.

RELATED ART

In recent years, mobile personal computers called "notebook computers" and digital still cameras called "digital cameras" have come into widespread use. Concurrently, portable music reproduction apparatuses, which include electronic appliances like CD (Compact Discs) players and MD (MiniDisc) players, have been subjected to miniaturization.

In this period, it has become possible to electrically connect a notebook computer and a digital camera, for example, to convert the images photographed by the digital camera into image signals that are inputted into the notebook computer, and to transmit the image signals via the Internet to a predetermined terminal apparatus (such as another personal computer). It has also become possible for a personal computer to connect to another computer via the Internet and download and enjoy music or other types of information.

In recent years, operations such as connecting a personal computer and a digital camera and transmitting and receiving image data as required between these devices, connecting a personal computer to a music reproduction apparatus and downloading music via the Internet, and connecting a plurality of personal computers and transmitting and receiving information data have become commonplace.

In this kind of environment, card-like electronic appliances that are small, convenient storage devices and are easy to carry have come into use, with the usage of such card-like electronic appliances being on the rise every year.

Devices in which information data is stored using semiconductor storage media are one example of the card-like electronic appliances that are available. Card-like electronic appliances that use semiconductor storage media are usually used in the following manner.

As one example, when a photograph is taken by a digital camera into which a card-like electronic appliance has been attached, the image that has been taken can be stored on the card-like electronic appliance as information data. After removing the card-like electronic appliance in which the image has been stored from the digital camera, the card-like electronic appliance can be attached to a personal computer and the stored data can be read, thereby making it possible for the image corresponding to the read information data to be reproduced on a screen.

By using a card-like electronic appliance for storing information data in this way with a digital camera or the like, the following problems can be overcome.

A first problem is as follows. When sending an image that has been photographed by a digital camera to a predetermined recipient, the digital camera is connected to the personal computer, the personal computer connects to the Internet, and the image is transmitted. However, the digital camera and the personal computer are not always present at the same location, so that the user has to go to the trouble of taking the digital camera to where the personal computer is located.

A second problem is that when a digital camera is connected to a personal computer and then used, a plurality of connecting cables have to be used to connect the terminals of the two devices and the user has to make a coordinated operation of the functions of the two devices, which makes such an arrangement difficult to use.

With regard to the above problems, when a semiconductor storage medium is used as a card-like electronic appliance, the semiconductor storage medium is much smaller and lighter than the digital camera and personal computer, and is very convenient in that there is almost no burden involved in carrying one. Also, a semiconductor storage medium can be installed in or removed from a digital camera or a personal computer extremely easily. When downloading music, only the semiconductor storage medium needs to be in the same location as the personal computer, so that music can be easily downloaded, which makes such semiconductor storage media very convenient.

One specific example of a card-like electronic appliance that is a semiconductor storage medium is a device called a "Memory Stick" that was developed by the applicant of the present invention. This semiconductor storage medium has a flat and slimline external case that is approximately rectangular, with a flash memory with a large storage capacity being enclosed within this external case. A terminal part where many connectors are exposed on one surface is provided at the front end of the external case that is inserted first. Concave parts for purposes such as positioning the semiconductor storage medium with respect to a drive apparatus are also provided on both sides of the external case.

With this kind of semiconductor storage medium, however, the connector pins in the terminal part for connecting to a digital camera, a personal computer, or the like are exposed to the outside and are uncovered. When a semiconductor storage medium is stored carelessly, there are the risks of dust and dirt adhering to the terminal part and lowering the electrical conductivity and of the semiconductor storage medium being damaged by contact with other objects, which can lead to deterioration in the performance of the semiconductor storage medium. If moisture adheres to the terminal part, there are the risks of rust occurring at the terminal part and of the memory breaking.

Since semiconductor storage media are small, there is also the problem that it is easy for them to go missing if they are stored separately. Also, if there is an increase in the number of semiconductor storage media used, the lack of an apparatus for storing a large number of semiconductor storage media has made it troublesome to manage a large number of such media.

The present invention was implemented in view of the problems with the related art, and has an object of providing a card-like electronic appliance holder that holds at least part of a card-like electronic appliance and protects the card-like electronic appliance against dust, dirt, and moisture, and protects the card-like electronic appliance against deterioration in the electrical conductivity and damage due to rust. The present invention also relates to a card-like electronic appliance support apparatus that can appropriately and easily store and organize a plurality of such card-like electronic appliance holders.

DISCLOSURE OF THE INVENTION

A card-like electronic appliance holder according to the present invention includes a holder main body with an appliance insertion hole into which at least part of a card-like electronic appliance is inserted; a support part with a through-hole for hanging the holder main body or a linking means for linking the holder main body to another object of a same type; and a convex part that is provided on an inside of the appliance insertion hole, engages a concave part provided on the card-like electronic appliance, and holds the card-like electronic appliance.

Alternatively, a card-like electronic appliance according to the present invention includes a holder main body with an appliance insertion hole into which at least part of a card-like electronic appliance is inserted and is equipped with a rib part that is disposed in a vicinity of an opening of the appliance insertion hole and touches the card-like electronic appliance so as to be in tight contact with at least one surface of the card-like electronic appliance of a sweeping member that is disposed inside the appliance insertion hole and sweeps a connection part of the card-like electronic appliance when the card-like electronic appliance is inserted or removed.

Furthermore, the card-like electronic appliance holder of the present invention includes a holder main body with an appliance insertion hole into which at least part of a card-like electronic appliance is inserted and is equipped with a holding means that can hold a card-like electronic appliance in the holder main body by being wound around the card-like electronic appliance.

A card-like electronic appliance support apparatus according to the present invention includes: a holder with an appliance insertion hole for inserting at least part of a card-like electronic appliance and a through-hole for hanging the holder; and a support for supporting the holder via a support part that is inserted into the through-hole of the holder. Inside the appliance insertion hole of the holder, a convex part engages a concave part provided in the card-like electronic appliance and holds the card-like electronic appliance.

BRIEF DESCRIPTION OF THE DRAWINGS

FIG. 6 shows a sixth embodiment of a card-like electronic appliance holder according to the present invention, with FIG. 6A being a frontal view and FIG. 6B being a side view.

FIG. 7 shows a seventh embodiment of a card-like electronic appliance holder according to the present invention, with FIG. 7A being a frontal view and FIG. 7B being a side view.

FIG. 8 shows an eighth embodiment of a card-like electronic appliance holder according to the present invention, with FIG. 8A being a perspective view of the state where the hanging ring is closed and FIG. 8B being a vertical cross-sectional view of the central part.

FIG. 9 shows the eighth embodiment of a card-like electronic appliance holder according to the present invention, with FIG. 9A being a frontal view of a state where the hanging ring is open and FIG. 9B being a side view of the same state.

FIG. 19 shows a thirteenth embodiment of a card-like electronic appliance holder according to the present invention, with FIG. 19A being a perspective view of one surface seen from the left side and FIG. 19B being a perspective view, partially in cross-section, of another surface seen from the right side.

FIG. 20 shows the thirteenth embodiment of the card-like electronic appliance holder according to the present invention, with FIG. 20A being a cross-sectional view for a case where there is one convex part and FIG. 20B being a cross-sectional view for a case where there are two convex parts.

FIG. 29 shows a seventeenth embodiment of a card-like electronic appliance holder according to the present invention, with FIG. 29A being a perspective view of one surface seen from the left side and FIG. 29B being a perspective view of another surface seen from the right side.

FIG. 30 is a cross-sectional view of the linking means that links together two card-like electronic appliance holders according to the seventeenth embodiment of the present invention.

FIG. 41 shows a second embodiment of a card-like electronic appliance support apparatus according to the present invention, with FIG. 41A being a frontal view and FIG. 41B being a side view.

BEST MODE FOR CARRYING OUT THE PRESENT INVENTION

The following describes several embodiments of the present invention with reference to the attached drawings. FIGS. 1 to 46 show examples of how the present invention can be embodied.

Figure 15:
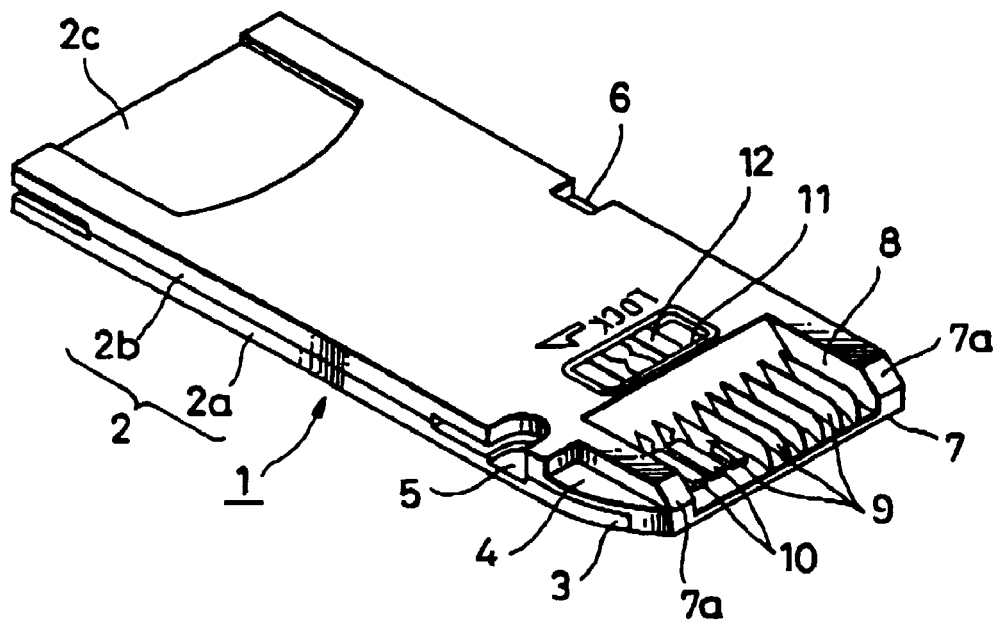
FIG. 15 is a perspective view of a first embodiment of a card-like electronic appliance that is used with the card-like electronic appliance holder according to the present invention.

First, a card-like electronic appliance that is used with the card-like electronic appliance holder of the present invention is explained. FIG. 15 shows a semiconductor storage medium that is a first embodiment of a card-like electronic appliance. This semiconductor storage medium is normally referred to as a "memory Stick". The semiconductor storage medium (Memory Stick) 1 has an external case 2 composed of a flat, slimline, rectangular casing. Flash EEPROMs that are non-volatile semiconductor memories with a large storage capacity are enclosed on the inside of the external case as an information storing unit for storing information. This information storing unit is not limited to flash EEPROMs, so that other types of memory that use semiconductors may be used.

The external case 2 is composed of a pair of an upper case 2a and a lower case 2b that are made of plastic and are arranged one on top of the other in a vertical direction to form a single body. When the upper case 2a and lower case 2b are arranged with one on top of the other, a hollow internal enclosure in which a plurality of flash EEPROMs and a controller for controlling the flash EEPROMs are enclosed is formed between the upper case 2a and lower case. 2b. The upper case 2a and lower case 2b are then combined with the upper case 2a and lower case 2b arranged one on top of the other in this way, such as by applying ultrasonic waves to melt the surfaces to be fused together so that the melted parts function as an adhesive. As a result, the external case 2 is produced as an integral body.

A guide part 3, which has a curved surface that curves gently from one of the short sides in the longitudinal direction to one of the side surfaces, and a cutaway part 4, which has side surfaces that are cut away from the guide part 3 and a lower surface that is also cut away, are formed at one corner of the external case 2. This guide part 3 and cutaway part 4 function so as to prevent a user from erroneously inserting the semiconductor storage medium 1 into an electronic appliance (such as a personal computer or a digital still camera known as a "digital camera") in which the semiconductor storage medium 1 is used.

Corresponding to the guide part 3 and the cutaway part 4, a convex part that prevents erroneous insertion is provided at a predetermined position of a storage medium enclosing part of an electronic appliance. When a semiconductor storage medium 1 has been inserted correctly, the erroneous insertion preventing convex part fits into the cutaway part 4 provided at the front of the inserted side, and by having the convex part engage the semiconductor storage medium 1 until a predetermined position is reached, the semiconductor storage medium 1 is correctly attached at the predetermined position in the storage medium enclosing part. On the other hand, when the semiconductor storage medium 1 is erroneously inserted upside down, the erroneous insertion preventing convex part comes in contact with a corner part on the opposite side of the guide part 3, thereby making it impossible for the semiconductor storage medium 1 to be inserted further. This stops the semiconductor storage medium 1 from being erroneously inserted.

A U shaped concave part 5, where the side surface and bottom surface of the external case 2 are cut away, is formed in a long side on the same side of the external case 2 as the guide part 3. This concave part 5 engages a detection sensor for detecting the state of the information storing unit. To do so, a slit that connects the storage medium enclosure with the outside is formed on the side of this concave part 5. A square concave part 6, where the side surface and bottom surface of the external case 2 are cut away, is also formed on a long side on the opposite side of the external case 2. This concave part 6 engages a positioning convex part provided on an electronic appliance. When the semiconductor storage medium 1 is correctly attached to the storage medium enclosing part of an electronic appliance, the positioning convex part engages the concave part 6, resulting in the semiconductor storage medium 1 being positioned and set at the predetermined position.

A terminal part 7 for connecting the semiconductor storage medium 1 to an electronic appliance is provided on the same short side of the external case 2 in the longitudinal direction as the guide part 3. The terminal part 7 includes a recessed part 8 where one flat surface and a front surface have been cut away and a plurality of partitioning ribs 9 that partition the inside of the recessed part 8 in a width direction. Connector pins 10 are disposed in the spaces produced by the partitioning ribs 9. Accordingly, a plurality of connector pins 10 are arranged horizontally with the front end part of each connector pin 10 being exposed between the partitioning ribs 9. The other ends of the plurality of connector pins 10 are connected to a printed circuit board enclosed within the external case 2.

The EEPROMs and controller that were mentioned earlier are mounted with other electronic components on this printed circuit board. An erroneous deletion prevention device that stops the information recorded in the memory from being erroneously deleted is also mounted on this printed circuit board. Corresponding to this erroneous deletion prevention device, an operation window 11 is provided as an opening in the lower case 2b. An operation part 12 of a slide switch of the erroneous deletion prevention device is fitted into this operation window 11 and is able to slide.

When the semiconductor storage medium 1 is attached to an electronic appliance, the plurality of connector pins 10 are separately connected to terminals of the electronic appliance that are inserted into the connector pins 10 from the front. To facilitate this connecting with the terminals of the electronic appliance, slanted surfaces 7a are provided at the front corner parts on the front surface of the external case 2. A label attachment concave part 2c is also provided on the external case 2. This label attachment concave part 2c has a predetermined width and extends up to a position close to the front surface of the upper case 2a.

Figure 16:
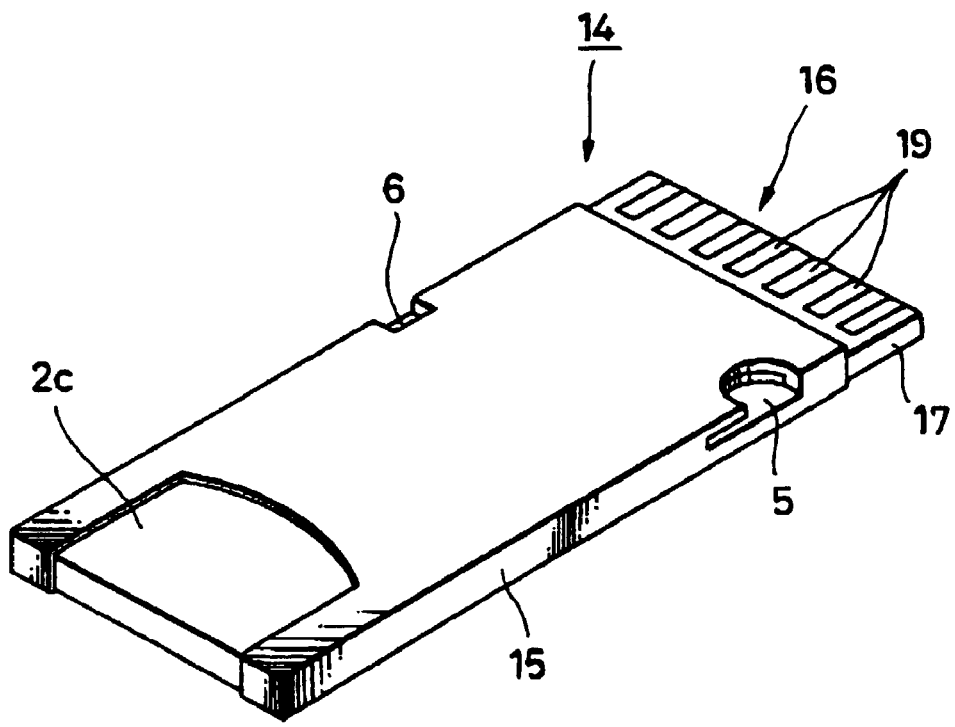
FIG. 16 is a perspective view of a second embodiment of a card-like electronic appliance that is used with the card-like electronic appliance holder according to the present invention.

FIG. 16 shows a second embodiment of a semiconductor storage medium to which the present invention has been applied. The only difference between the semiconductor storage medium 14 shown as the second embodiment and the semiconductor storage medium 1 described above is the terminal part 16. Accordingly, the parts in FIG. 16 that are the same as in FIG. 15 have been given the same reference numbers and are not described, so that only the terminal part 16 is described.

Figure 17:
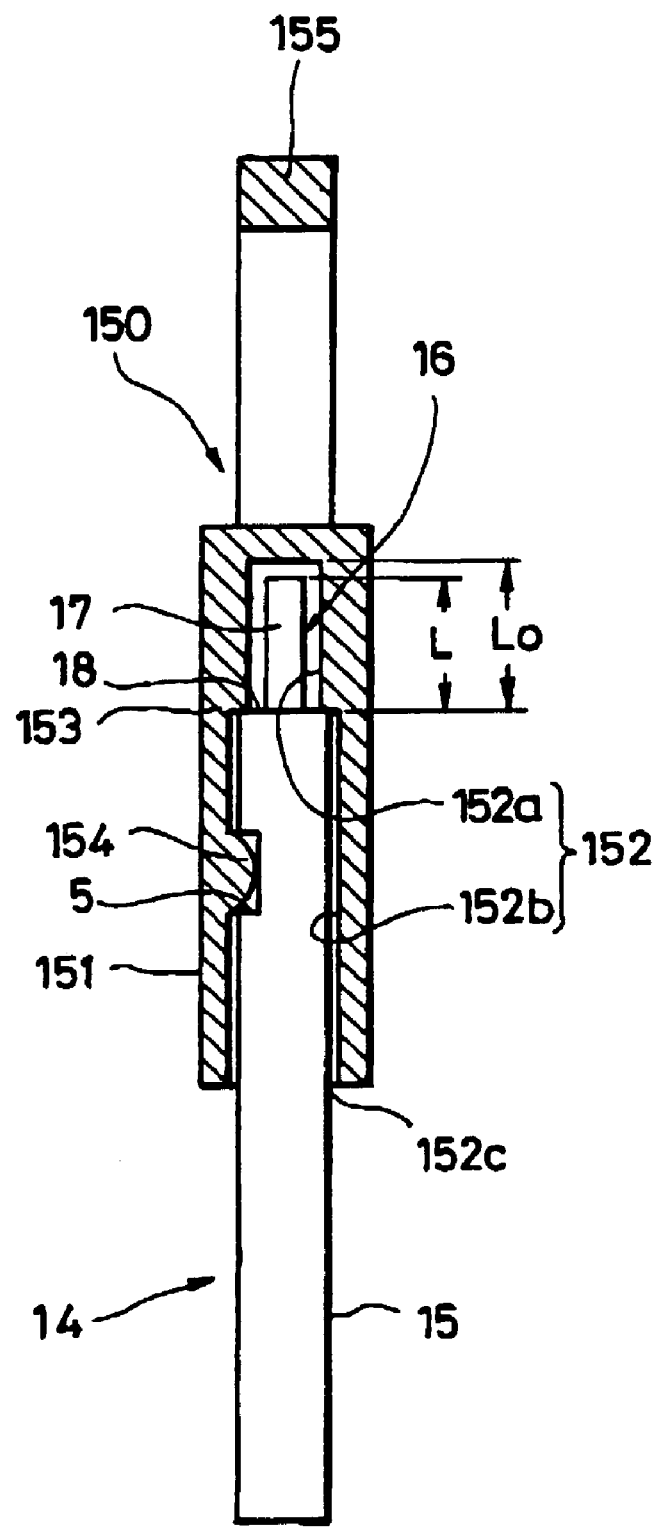
FIG. 17 is a vertical cross-sectional view showing how the card-like electronic appliance holder is used when the second embodiment of the card-like electronic appliance that relates to the present invention has been attached into the card-like electronic appliance holder.

The terminal part 16 of the semiconductor storage medium 14 has a projecting bar part 17 that is formed so as to project sideways from a central part of one surface in the longitudinal direction of the external case 2. By providing this projecting bar part 17, as shown in FIG. 17, stepped parts 18, 18 that are continuous in the width direction are formed on both sides of the projecting bar part 17. Each of a plurality of connector pins 19 are arranged horizontally at equal intervals on both surfaces of the projecting bar part 17. The remaining parts of the construction are the same as in the semiconductor storage medium 1.

The following is a detailed description of card-like electronic appliance holders and card-like electronic appliance support apparatuses for holding the semiconductor storage medium 1 or 14 with the constructions described above or other card-like electronic appliances.

Preferable materials for the card-like electronic appliance holders described below include polypropylene (PP), synthetic rubber (a urethane elastomer, silicone elastomer, acrylic elastomer, SBR, etc.), and the like. The reason for this is that PP or an elastomer exhibit a certain degree of hardness along with excellent elasticity and superior mechanical properties (such as tearing resistance and abrasion resistance). However, it should be obvious that other plastics and elastomers may be used.

The card-like electronic appliance holder 20 of the first embodiment shown in FIGS. 1A to 1E is composed of a holder main body 21 that includes an appliance insertion hole 23 in which the terminal part 7 of a semiconductor storage medium 1 is inserted, and a support part 22 with a through-hole 24 for hanging the holder main body 21.

The holder main body 21 is composed of a slimline, hollow case in the form of a flattened cube, with an opening 23a for the appliance insertion hole 23 being provided in one of the four sides of reduced width. This appliance insertion hole 23 is formed so to correspond to the terminal part 7 of the semiconductor storage medium 1 in size and shape and is made sufficiently deep to cover a predetermined part of the terminal part 7.

A convex part 25, which engages the concave part 5 provided in the semiconductor storage medium 1 and holds the semiconductor storage medium 1, is provided in the inside of the appliance insertion hole 23. To do so, the convex part 25 is provided at a position that corresponds to the concave part 5 when the semiconductor storage medium 1 has been inserted into the predetermined position of the appliance insertion hole 23.

In more detail, the convex part 25 is formed as a half-cylinder that has a curved surface that is angled in the direction in which the semiconductor storage medium 1 is inserted and removed. The convex part 25 is provided with elasticity by choosing an appropriate material to form the convex part 25. The shape of the convex part 25 is not limited to a half-cylinder as shown in this embodiment, so that the convex part 25 may be formed in the shape of a hemisphere where the entire outer surface is curved, a truncated pyramid that has straight angled surfaces on both sides in the direction in which the semiconductor storage medium 1 is inserted or removed, or another shape.

A support part 22 with a through-hole 24 for hanging the holder main body 21 is formed on the opposite side of the opening 23a of the holder main body 21 of the appliance insertion hole 23. This support part 22 is formed of a holder part that is bent into a U shape, with the opening on the inside of the support part 22 being the through-hole 24. Due to a notch 26 that is provided in a sloped side part, the support part 22 is divided into a first arm segment 27 and a second arm segment 28. The end parts of these arm segments 27 and 28 are in contact and overlap slightly in the internal-external direction, and are constructed so that the notch 26 is closed in its natural state.

One out of the two arm segments 27 and 28 of the support part 22 is provided with elasticity to make it flexible, thereby making it possible to open and close the notch 26. In the case where the first arm segment 27 is provided with elasticity to make it flexible and the rigidity of the second arm segment 28 is increased to make elastic deformation difficult, the notch 26 can be opened by elastically deforming the first arm segment 27 outwards. On the other hand, in the case where the second arm segment 28 is provided with elasticity to make it flexible and the rigidity of the first arm segment 27 is increased to make elastic deformation difficult, the notch 26 can be opened by elastically deforming the second arm segment 28 inwards.

By elastically deforming one of the arm segments 27 and 28 and opening the notch 26 in this way, a support (described later in this specification) can be passed through the notch 26 so that the card-like electronic appliance holder 20 can be attached to and removed from the support. It should be noted that both of the two arm segments 27 and 28 may be provided with elasticity, and in this case, the notch 26 can be opened by elastically deforming an arm segment selected out of the first and second arm segments 27 and 28.

FIGS. 2 to 7 show modifications of the card-like electronic appliance holder 20 that is shown in FIG. 1. The differences between the second to seventh embodiments and the first embodiment lie in the external form of the holder main body and in the method of combination of the two arm segments based on differences in the form of the notch provided in the support part. The provision of the appliance insertion hole 23 in the holder main body and the formation of the convex part 25 in the inside of the appliance insertion hole 23 is unchanged for the second to seventh embodiments, so that the same parts have been given the same reference numerals and an explanation of such has been omitted.

Figure 1A:
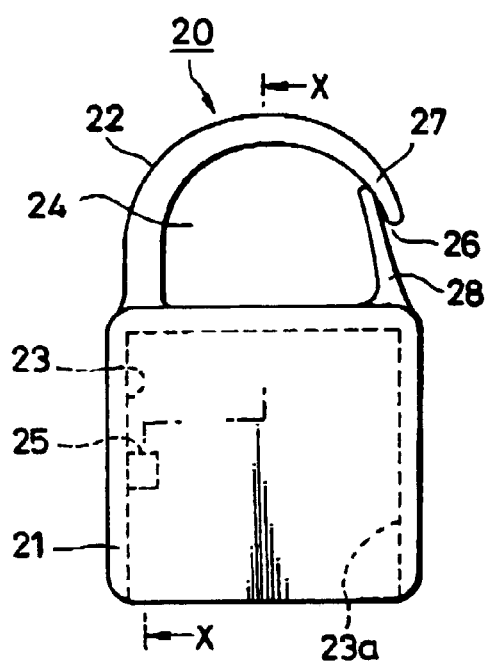
FIG. 1 shows a first embodiment of a card-like electronic appliance holder according to the present invention, with FIG. 1A being a frontal view, FIG. 1B being a side view, FIG. 1C being a bottom view, FIG. 1D being a cross-sectional view taken along the line Y—Y in FIG. 1B, and FIG. 1E being a cross-sectional view taken along the line X—X in FIG. 1A.
Figure 1B:
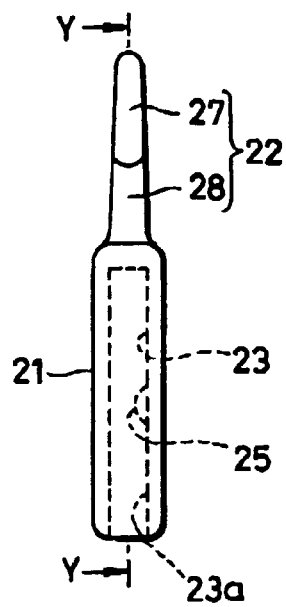
Figure 1C:
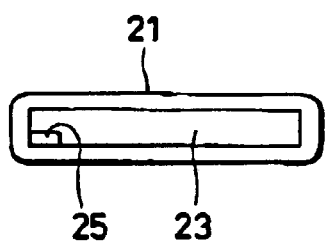
Figure 1D:
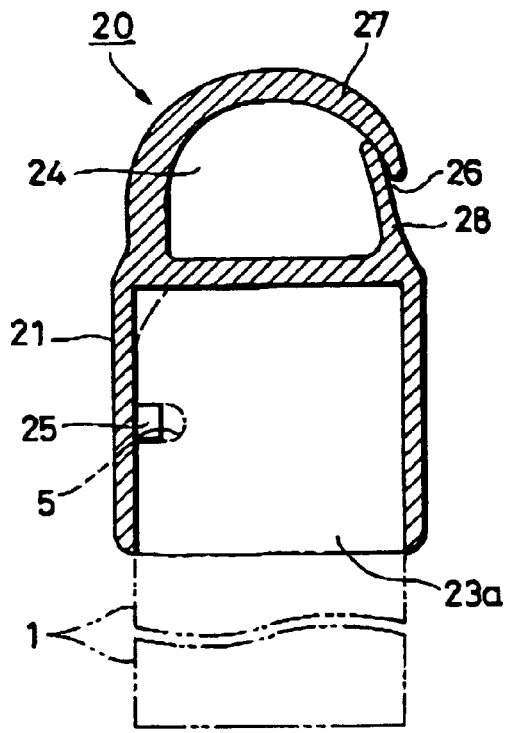
Figure 1E:
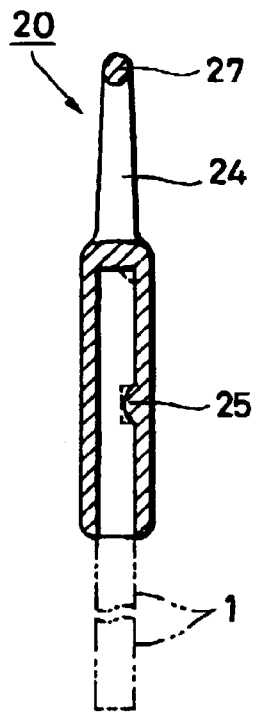
Figure 2A:
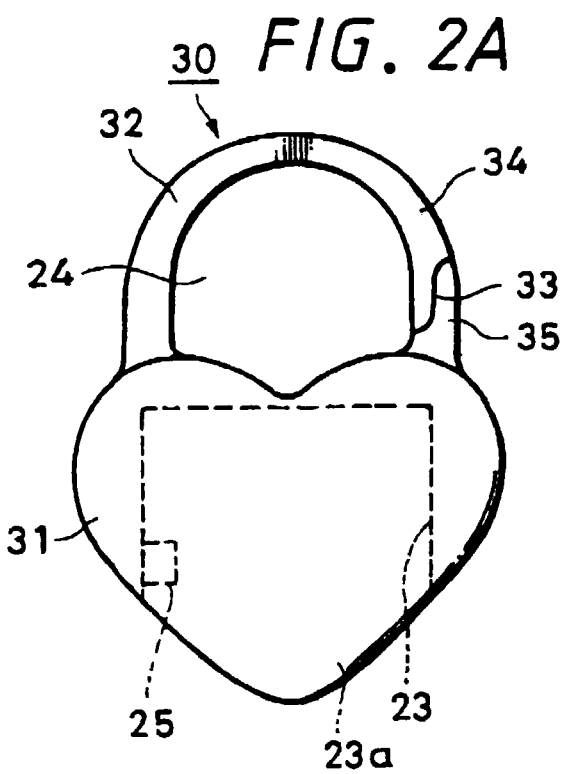
FIG. 2 shows a second embodiment of a card-like electronic appliance holder according to the present invention, with FIG. 2A being a frontal view and FIG. 2B being a side view.
Figure 2B:
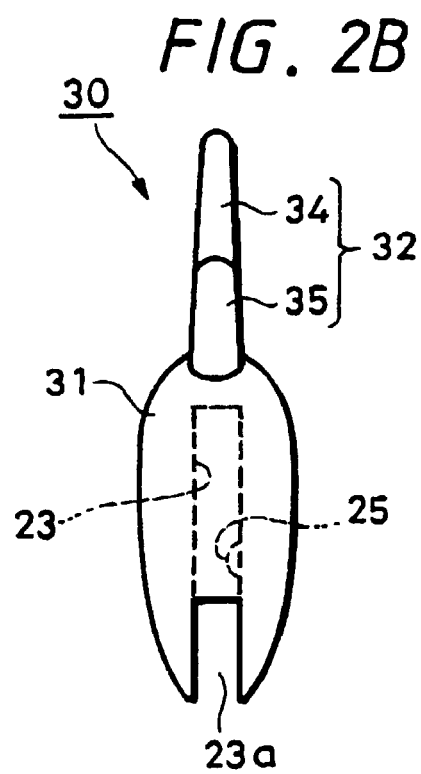

A card-like electronic appliance holder 30 according to the second embodiment of the present invention that is shown in FIGS. 2A and 2B has a holder main body 31 formed in a heart shape. A support part 32 is formed of a holder part that is bent into a U shape, with the opening on the inside of the support part 32 being a through-hole 34. Due to an S-shaped notch 33 that is provided in a side part, the support part 32 is divided into a first arm segment 34 and a second arm segment 35. The tips of the arm segments 34 and 35 are in contact and overlap slightly in the internal-external direction, and a reconstructed so that the notch 33 is closed in its natural state.

In the present embodiment, the first arm segment 34 may be provided with elasticity so as to be flexible and the second arm segment 35 may be provided with rigidity to make elastic deformation difficult. When this construction is used, the notch 33 can be opened by bending the first arm segment 34 inwards.

Figure 3A:
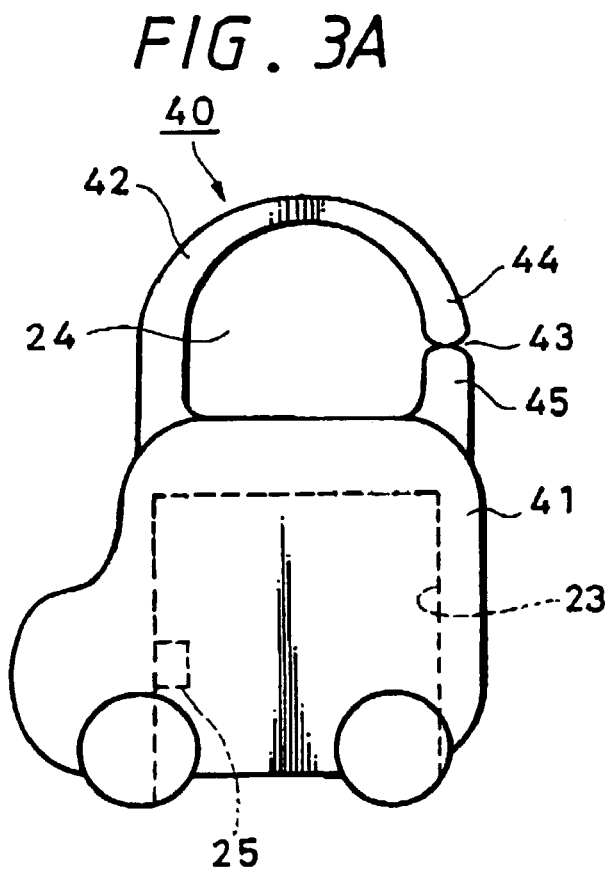
FIG. 3 shows a third embodiment of a card-like electronic appliance holder according to the present invention, with FIG. 3A being a frontal view and FIG. 3B being a side view.
Figure 3B:
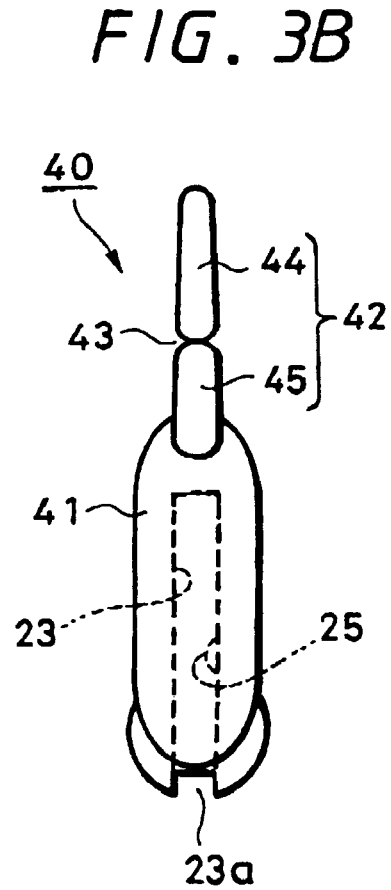

A card-like electronic appliance holder 40 according to the third embodiment of the present invention that is shown in FIGS. 3A and 3B has a holder main body 41 formed in the shape of a car. A support part 42 is formed of a holder part that is bent into a U shape, with the opening on the inside of the support part 42 being a through-hole 24. Due to a notch 43 that is provided in a side part, the support part 42 is divided into a first arm segment 44 and a second arm segment 45. The ends of these arm segments 44 and 45 are rounded and the tip parts are in contact, with the arm segments 44 and 45 being constructed so that the notch 43 is closed in its natural state.

In the present embodiment, the first arm segment 44 may be provided with elasticity so as to be flexible and the second arm segment 45 may be provided with rigidity to make elastic deformation difficult. When this construction is used, the first arm segment 44 can be bent either inwards or outwards, with the notch 43 being opened in either case.

Figure 4A:
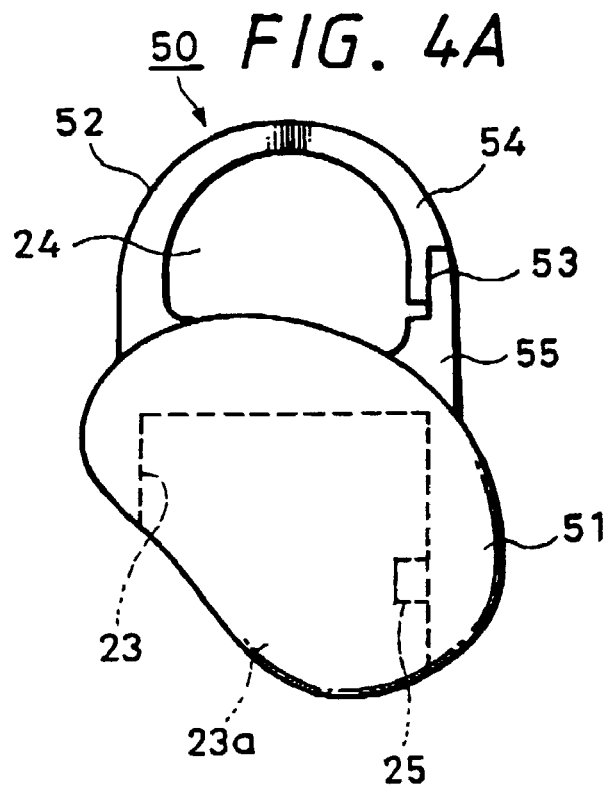
FIG. 4 shows a fourth embodiment of a card-like electronic appliance holder according to the present invention, with FIG. 4A being a frontal view and FIG. 4B being a side view.
Figure 4B:
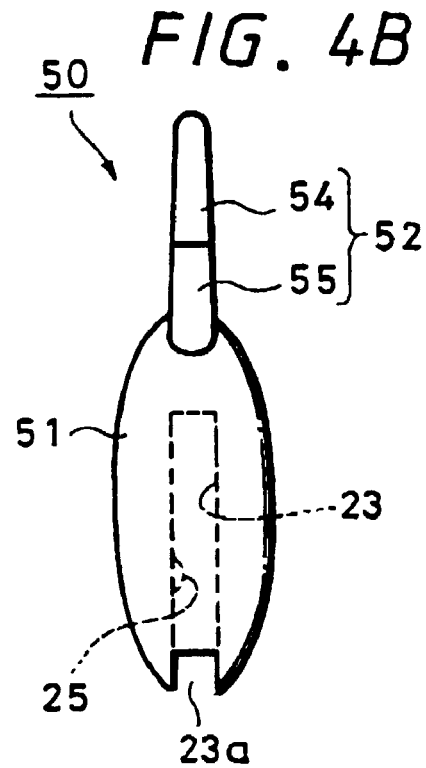

A card-like electronic appliance holder 50 according to the fourth embodiment of the present invention that is shown in FIGS. 4A and 4B has a holder main body 51 formed in the shape of a broad bean. A support part 52 is formed of a holder part that is bent into a U shape, with the opening on the inside of the support part 52 being the through-hole 24. Due to a crank-shaped notch 53 that is provided in a side part, the support part 52 is divided into a first arm segment 54 and a second arm segment 55. The end parts of the arm segments 54 and 55 are in contact with the ends overlapping slightly in an inward/outward direction, and are constructed so that the notch 53 is closed in its natural state.

In the present embodiment, the first arm segment 54 may be provided with elasticity so as to be flexible, and the second arm segment 55 may be provided with rigidity to make elastic deformation difficult. When this construction is used, the notch 53 can be opened by bending the first arm segment 54 inwards.

Figure 5A:
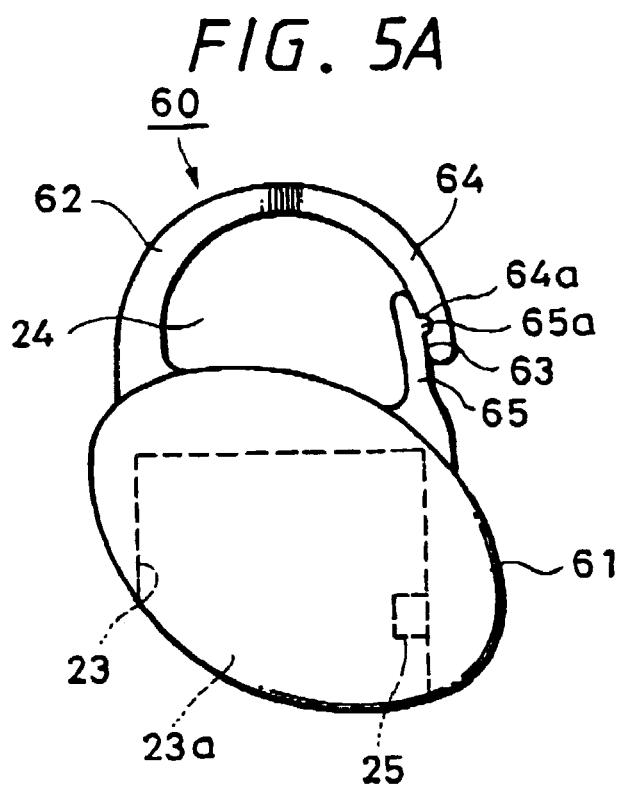
FIG. 5 shows a fifth embodiment of a card-like electronic appliance holder according to the present invention, with FIG. 5A being a frontal view and FIG. 5B being a side view.
Figure 5B:
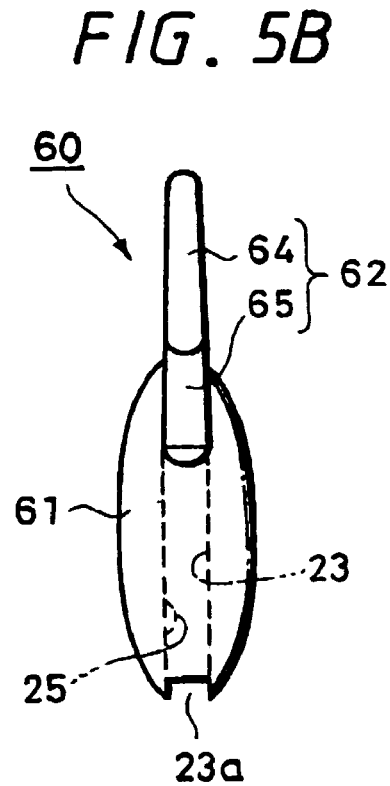

A card-like electronic appliance holder 60 according to the fifth embodiment of the present invention that is shown in FIGS. 5A and 5B has a holder main body 61 formed in the shape of an American football. A support part 62 is formed of a holder part that is bent into a U shape, with the opening on the inside of the support part 62 being the through-hole 24. Due to a notch 63 that is provided in a side part, the support part 62 is divided into a first arm segment 64 and a second arm segment 65. The end parts of these arm segments 64 and 65 are in contact with the ends overlapping slightly in an inward/outward direction, and are constructed so that the notch 53 is closed in its natural state. At the contacting parts of the arm segments 64 and 65, an engagement concave part 64a is formed in the first arm segment 64 and an engagement convex part 65a that engages the engagement concave part 64a is formed in the second arm segment 65.

In the present embodiment, either of the first arm segment 64 and the second arm segment 65 can be provided with elasticity to make the arm segment flexible, or alternatively both the first arm segment 64 and the second arm segment 65 can be provided with elasticity to make both arm segments flexible. When only one of the arm segments is provided with elasticity, the notch 63 can be opened by bending the arm segment provided with elasticity. On the other hand, when both of the arm segments are provided with elasticity, the notch 63 can be opened by bending either of the arm segments. By having the engagement concave part 64a of the first arm segment 64 engage the engagement convex part 65a of the second arm segment 65, these parts act as a lock, so that it can be made difficult for the notch 63 to come open.

A card-like electronic appliance holder 70 according to the sixth embodiment of the present invention that is shown in FIGS. 6A and 6B has a holder main body 71 formed in the shape of a four-leafed clover. A support part 72 is formed of a holder part that is bent into a U shape, with the opening on the inside of the support part 72 being the through-hole 24. Due to a Z-shaped notch 73 that is provided in a side part, the support part 72 is divided into a first arm segment 74 and a second arm segment 75. The end parts of these arm segments 74 and 75 overlap slightly in the internal-external direction and are in contact, and are constructed so that the notch 73 is closed in its natural state.

In the present embodiment, the first arm segment 74 may be provided with elasticity so as to be flexible, and the second arm segment 75 may be provided with rigidity to make elastic deformation difficult. When this construction is used, the notch 73 can be opened by bending the first arm segment 74 inwards.

A card-like electronic appliance holder 80 according to the seventh embodiment of the present invention that is shown in FIGS. 7A and 7B has a holder main body 81 formed in the shape of a money pouch. A support part 82 is formed of a holder part that is bent into a U shape, with the opening on the inside of the support part 82 being the through-hole 24. Due to an S-shaped notch 83 that is provided in a side part, the support part 82 is divided into a first arm segment 84 and a second arm segment 85. The end parts of these arm segments 84 and 85 overlap slightly in the internal-external direction and are in contact, and are constructed so that the notch 83 is closed in its natural state. Cut away parts 84a, 85a are also provided at the tips of the arm segments 84 and 85 by cutting of f the tips of the respective arm segments.

In the present embodiment, the first arm segment 84 may be provided with elasticity so as to be flexible, and the second arm segment 85 may be provided with rigidity to make elastic deformation difficult. When this construction is used, the notch 83 can be opened by bending the first arm segment 84 inwards. Since cut away parts 84a and 85a are provided at the tips of the arm segments 84 and 85, the first arm segment 84 can be bent extremely easily by applying pressure to the first arm segment 84 using the cut away parts 84a and 85a.

A card-like electronic appliance holder 90 according to the eighth embodiment of the present invention that is shown in FIGS. 8A and 8B and FIGS. 9A and 9B has a hanging ring 92, which represents a different embodiment of a support part, attached to the holder main body 91 so as to be freely rotatable. In more detail, the card-like electronic appliance holder 90 is made up of a holder main body 91 that has an appliance insertion hole 23 in which the terminal part 7 of the semiconductor storage medium 1 is inserted, and a hanging ring 92 that is a support part with a through-hole 24 for hanging the holder main body 91.

The holder main body 91 is composed of a hollow case in the form of a flattened cube, with an opening 23a for the appliance insertion hole 23 being provided in one of the four sides of reduced width. This appliance insertion hole 23 is formed 60 as to correspond to the terminal part 7 of the semiconductor storage medium 1 in size and shape and is made sufficiently deep to cover a predetermined part of the terminal part 7. A convex part 25 that engages the concave part 5 provided in the semiconductor storage medium 1 and holds the semiconductor storage medium 1 is provided in the inside of the appliance insertion hole 23.

Also, a hanging ring storage part 93 composed of a recessed part in which the hanging ring 92 can be stored is provided in one out of the two wide surfaces of the holder main body 91 that face one another on opposite sides of the appliance insertion hole 23. The hanging ring storage part 93 has a shape that corresponds to the hanging ring 92, and includes a circular concave part 93a that is formed in an approximately central part and a linking concave part 93b that links the circular concave part 93a to an opposite side of the appliance insertion hole 23 of the holder main body 91. The two surfaces of the linking concave part 93b are parallel and bearing holes that form a pair are formed in these two surfaces.

The hanging ring 92 has a ring part 92a and a base part 92b that is connected to part of the ring part 92a and projects outward. The base part 92b is provided with shaft parts 92c, 92c that lie on the same central axis line and project outwards in opposite directions from the base part 92b so as to diverge. The end parts of these shaft parts 92c, 92c engage a pair of bearing holes provided in the linking concave part 93b with the shaft parts 92c, 92c being free to rotate. The hanging ring 92 can be placed as shown in FIGS. 8A and 8B in a state in which the hanging ring 92 is stored in the hanging ring storage part 93 and as shown in FIGS. 9A and 9B in a state where the hanging ring 92 has been rotated by 180° and so projects from the opposite side of the opening 23a.

A card-like electronic appliance holder 95 according to the ninth embodiment of the present invention is the card-like electronic appliance holder 90 according to the eighth embodiment of the present invention that is shown in FIG. 8, etc., with a notch 96 formed in the hanging ring 92. The hanging ring 92 has a ring part 92a and a base part 92b, and a straight notch 96 is formed in one side part of the ring part 92a. Due to the presence of the notch 96, the ring part 92a includes a first arm segment 97a and a second arm segment 97b. The end parts of the first arm segment 97a and the second arm segment 97b are formed so as to face one another with a predetermined gap in between.

The remaining parts of the card-like electronic appliance holder 95 are the same as in the card-like electronic appliance holder 90, and so have been given the same reference numerals and are not explained. By forming the notch 96 in the ring part 92a and providing the first arm segment 97a with elasticity so as to make the first arm segment 97a flexible, the notch 96 can be opened by bending the first arm segment 97a inwards or outwards.

Figure 10A:
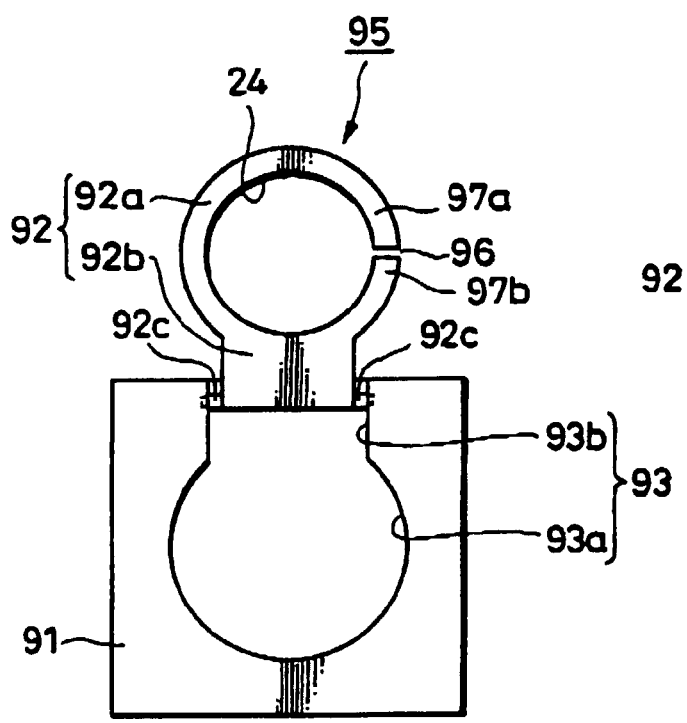
FIG. 10 shows a ninth embodiment of a card-like electronic appliance holder according to the present invention, with FIG. 10A being a frontal view of the state where the hanging ring is open and FIG. 10B being a frontal view of a modification of the hanging ring.
Figure 10B:
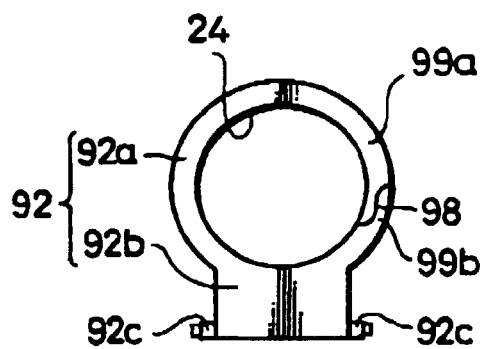

FIG. 10B shows a modified embodiment of the notch 96 in the hanging ring 92 shown in FIG. 10A. A notch 98 that is curved in an S shape is provided in the hanging ring 92 and the first and second arm segment 99a and 99b are formed on either side of the notch 98. In this case, the notch 98 can be opened by bending the first arm segment 99a inwards.

Figure 11:
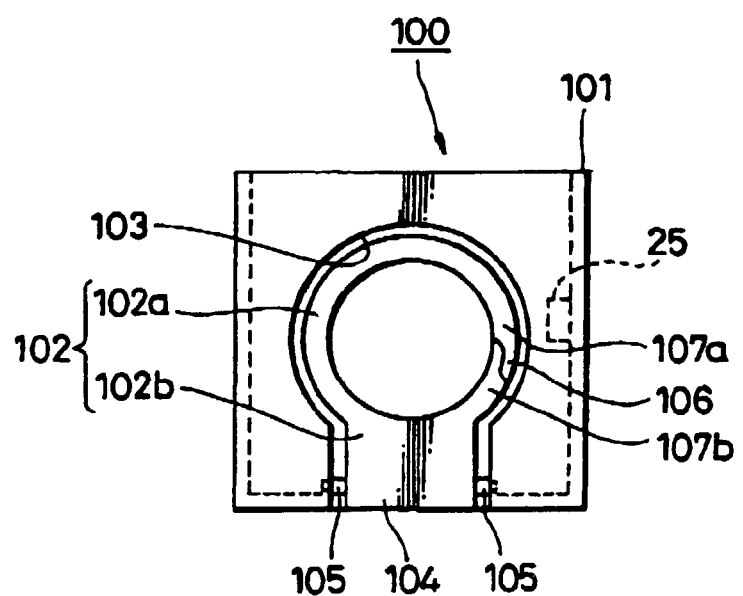
FIG. 11 is a frontal view of a tenth embodiment of a card-like electronic appliance holder according to the present invention with the hanging ring in a closed state.
Figure 12A:
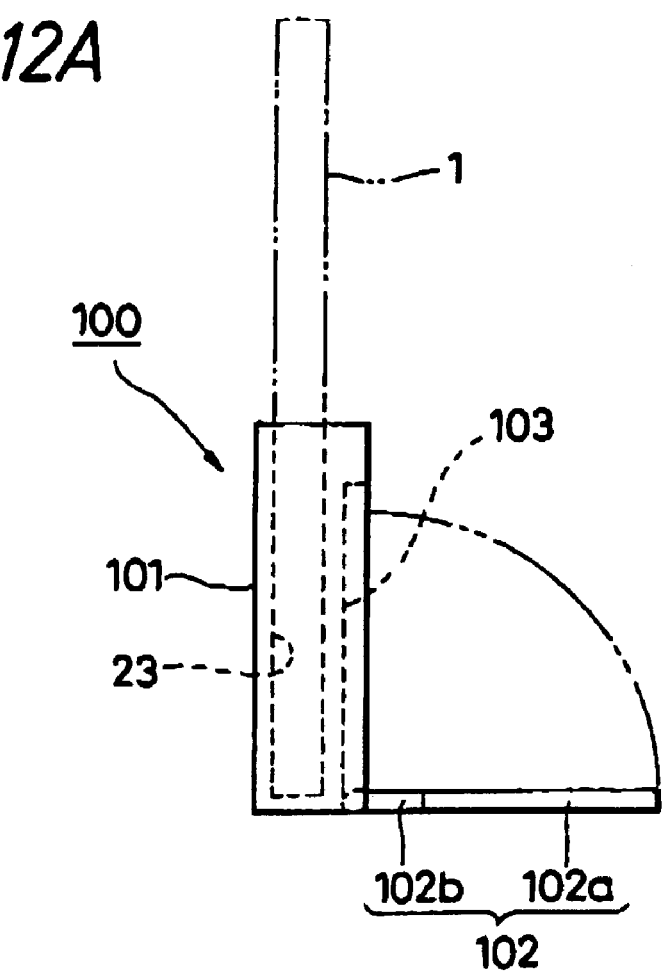
FIG. 12 shows the tenth embodiment of a card-like electronic appliance holder according to the present invention, with FIG. 12A being a side view of a state where the hanging ring has been raised to become a stand and FIG. 12B being a cross-sectional explanatory drawing in which the main parts shown in FIG. 12A have been enlarged.
Figure 12B:
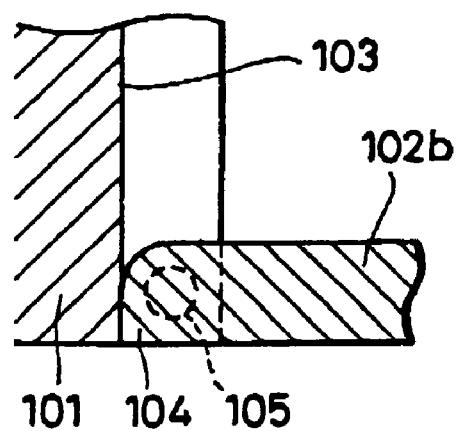

A card-like electronic appliance holder 100 according to the tenth embodiment of the present invention that is shown in FIG. 11 and FIGS. 12A and 12B is a modified embodiment of the card-like electronic appliance holder 90 that is shown in FIGS. 9A and 9B, etc., in which the hanging ring 92 can be used as a stand. The card-like electronic appliance holder is composed of a holder main body 101 and a hanging ring 102, with the hanging ring 102 having a ring part 102a and a base part 102b.

As shown in FIG. 12B, the base part 102b of the hanging ring 102 is provided with a rotation-stopping part 104 that limits the rotation of the hanging ring 102 to a predetermined angle. The rotation-stopping part 104 is formed by making a part of the pair of shaft parts 105, 105, about which the hanging ring 102 rotates, protrude in a convex manner at a corner between two surfaces. A notch 106 is formed in the ring part 102a, which results in first and second arm segments 107a, 107b being formed in the ring part 102a. The remaining parts of the construction are the same as in the eighth embodiment.

With the card-like electronic appliance holder 100 according to the tenth embodiment of the present invention, the hanging ring 102 can be rotated by 90° as shown in FIG. 12A from the state where the hanging ring is stored in the holder main part 101 as shown in FIG. 11 to take the hanging ring 102 out of the hanging ring storage part 103, with the hanging ring 102 then being used as a stand so that the holder main body 101 can be stood upright on a flat surface in a stable fashion. As a result, the card-like electronic appliance holder 100 can be used like a bookstand to hold a semiconductor storage medium 1 in an upright state.

Figure 13A:
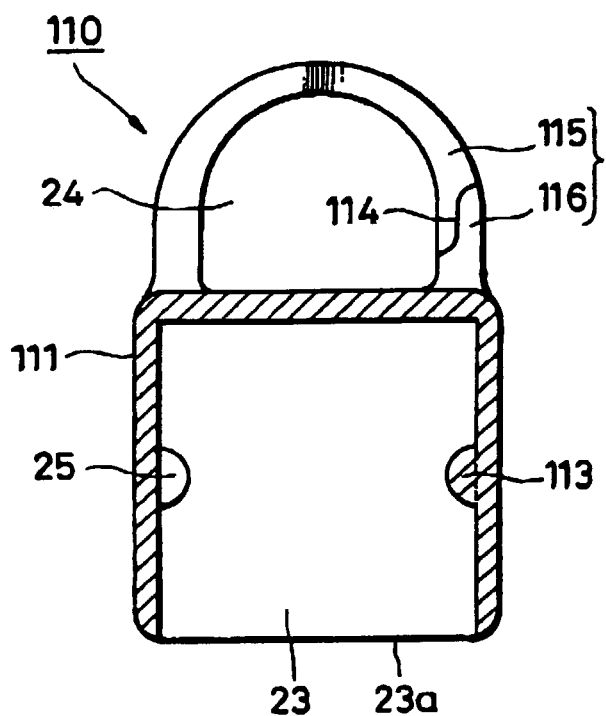
FIG. 13 shows an eleventh embodiment of a card-like electronic appliance holder according to the present invention, with FIG. 13A being a frontal view showing the holder in cross-section and FIG. 13B being a bottom view.
Figure 13B:
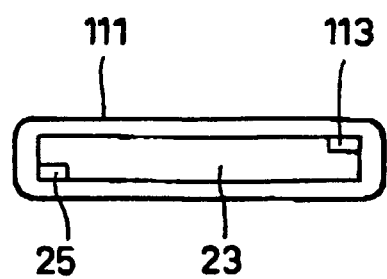

A card-like electronic appliance holder 110 according to the eleventh embodiment of the present invention that is shown in FIGS. 13A and 13B has another convex part 113 formed inside the appliance insertion hole 23 in addition to the convex part 25. The newly added convex part 113 is of the same size and the same shape as the convex part 25, and is formed at a (point symmetrical) position that falls on a diagonal that includes the convex part 25. The card-like electronic appliance holder 110 is composed of a holder main body 111, in which the appliance insertion hole 23 is formed, and a holder 112 that is a support part which is integrally formed with the holder main body 111. An S-shaped notch 114 is formed in the holder 112, resulting in a first arm segment 113 and a second arm segment 114 being formed in the holder 112.

With the card-like electronic appliance holder 110 according to this eleventh embodiment, if the insertion direction is the same, the semiconductor storage medium 1 does not have to be inserted with a predetermined side facing upwards and so can be inserted with another side facing upwards. This means that a semiconductor storage medium 1 can be inserted into the appliance insertion hole 23 and held and stored by the card-like electronic appliance holder without the user having to worry about which side of the semiconductor storage medium 1 should face upwards.

Figure 14A:
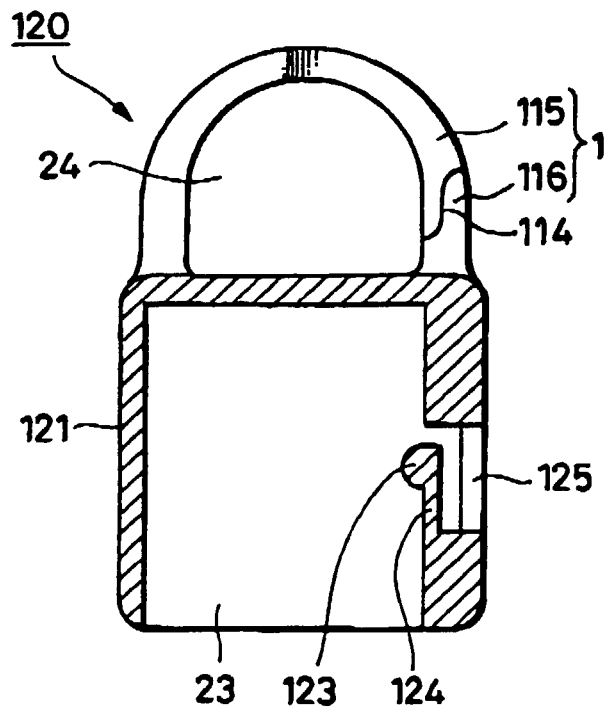
FIG. 14 shows a twelfth embodiment of a card-like electronic appliance holder according to the present invention, with FIG. 14A being a frontal view showing the holder in cross-section and FIG. 14B being a side view.
Figure 14B:
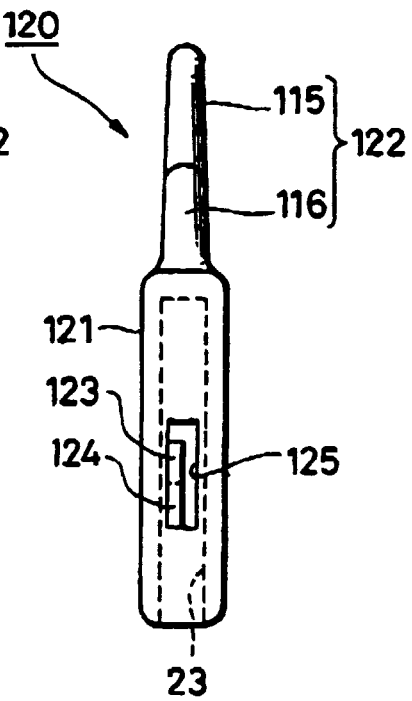

A card-like electronic appliance holder 120 according to the twelfth embodiment of the present invention that is shown in FIGS. 14A and 14B is formed with a construction where a convex part 123 is provided at an end part of an elastic member 124, so that the highly rigid convex part 123 can be elastically deformed by bending and deforming the elastic member 124. The card-like electronic appliance holder 120 is composed of a holder main body 121, in which the appliance insertion hole 23 is formed, and a holder 122 that is a support part which is integrally formed with the holder main body 121.

The elastic member 124 is formed so as to extend in a planar direction on a plane that is perpendicular to the direction in which the appliance insertion hole 23 extends. The convex part 123, which projects internally as a hemisphere, is provided on the end part of the elastic member 124. A space 125 for manufacturing the elastic member 124 using a mold is provided on the outside of the elastic member 124

With the card-like electronic appliance holder 120 according to the twelfth embodiment, the convex part 123 can be made very rigid, and since the elastic member 124 can be elastically deformed, the concave part 5 of the semiconductor storage medium 1 can reliably engage even a highly rigid convex part 123 by elastically deforming the elastic member 124. The engagement of the convex part 123 and the concave part 5 can also be easily released.

The card-like electronic appliance holders 20, 30, 40, 50, 60, 70, 80, 90, 95, 100, 110, and 120 with the constructions described above can be used in the following manner, for example. These card-like electronic appliance holders 20 to 120 are all used in the same way, so that the holder 20 shown in FIG. 1 is used below as a representative example.

For the card-like electronic appliance holder 20 to hold a semiconductor storage medium 1, the terminal part 7 side of the semiconductor storage medium 1 has to be inserted into the appliance insertion hole 23. When doing so, the front end part of the semiconductor storage medium 1 strikes the convex part 25, but due to the semiconductor storage medium 1 being continuously pushed in, the convex part 25 and the side wall of the holder main body 21 elastically deforms. As a result, the convex part 25 slides along the flat surface on the side of the external case 2 and then fits into the concave part 5. This engagement of the convex part 25 and the concave part 5 holds the semiconductor storage medium 1 in the holder 20.

On the other hand, the semiconductor storage medium 1 can be removed from the holder 20 for use by merely pulling the semiconductor storage medium 1 in the removal direction, i.e., towards the opening 23a. This results in the side wall of the holder main body 21 and the convex part 25 bending and deforming slightly, thereby removing the convex part 25 from the concave part 5 provided in the external case 2. As a result, the engagement (locking) of the concave part 5 and the convex part 25 is released, so that the semiconductor storage medium 1 can be quickly and easily removed.

Figure 18B:
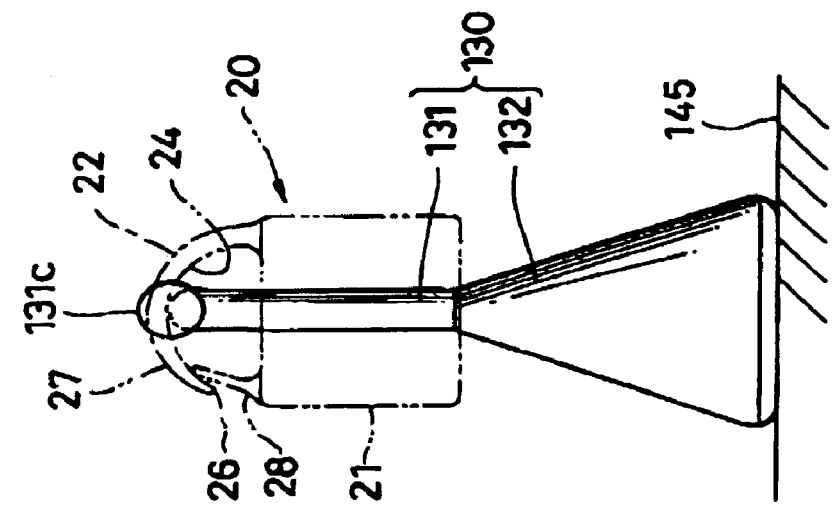
FIG. 18 shows a first embodiment of a card-like electronic appliance support apparatus according to the present invention, with FIG. 18A being a frontal view and FIG. 18B being a side view.
Figure 18A:
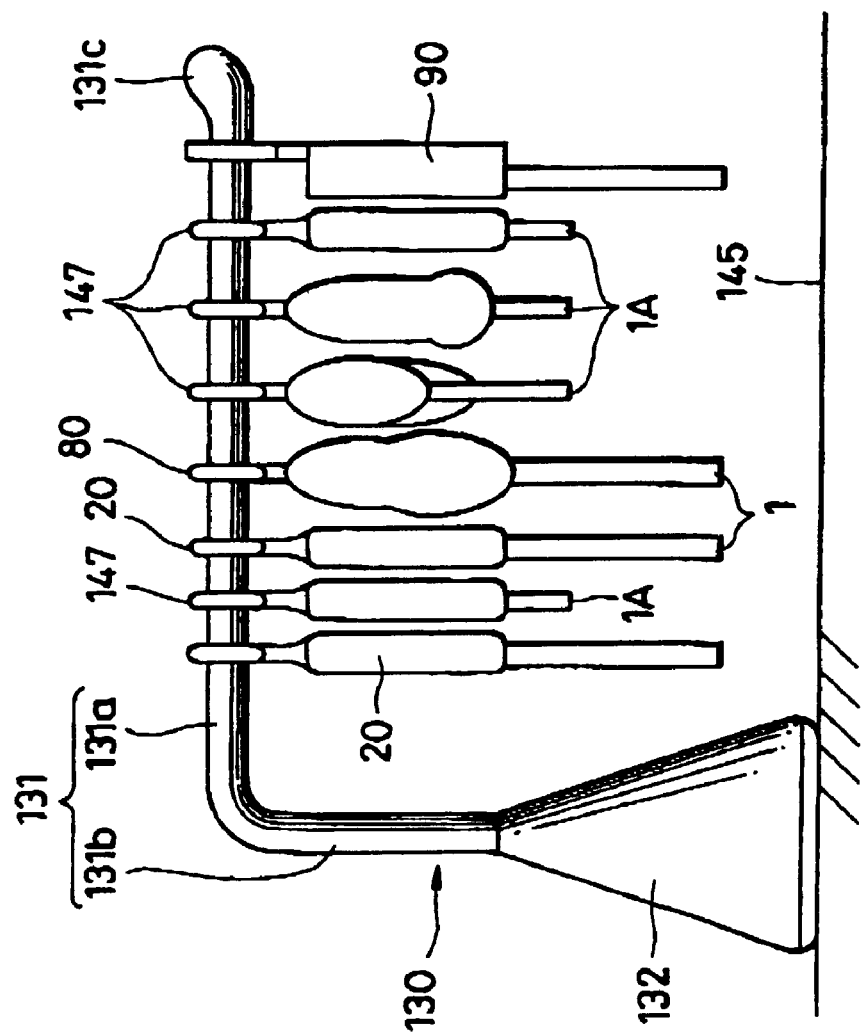

The card-like electronic appliance holders 20 to 120 with the constructions described above can be used with a card-like electronic appliance support apparatus 130 shown in FIGS. 18A and 18B so that many semiconductor storage media 1 can be stored as a collection in an easy-to-see, appropriate, and reliable manner.

The card-like electronic appliance support apparatus 130 is composed of a hanger-type support part 131 that can support a large number of card-like electronic appliance holders 20 and 120 that are suspended from the support part 131, and a weight part 132 that holds the support part 131 in a predetermined position.

The support part 131 is composed of a bar-like member formed in the shape of an L and has a suspended part 131a that extends horizontally and a riser part 131b that is connected to one end of the suspended part 131a and extends downwards. A stopper part 131c that is slightly bent upwards and slightly swollen to make it difficult for holders to come off is provided at the end part of the suspended part 131a. This stopper part 131c prevents card-like electronic appliance holders 20 to 120 from moving along the axial direction of the suspended part 131a and coming off the end. The bottom end part of the riser part 131b is integrally fixed to the weight part 132.

The weight part 132 holds the support part 131 in a predetermined position and is formed of a heavy weight. In the present embodiment, the weight part 132 is conical, though it should be obvious that the weight part 132 is not restricted to this shape and other shapes, such as a cylinder, a square pillar, or a pyramid, may be used.

In the present embodiment, the support part 131 is held in a predetermined position by the weight of the weight part 132, though a different construction may be used in which, for example, double-sided tape, adhesive plastic, or the like is stuck to the lower surface of the weight part 132 and the support part 131 is supported by the adhesive force of such material. Alternatively, a construction may be used in which one or more suction cups are attached to the lower surface of the weight part 132 and the support part 131 is supported by the suction force of the suction cups.

The card-like electronic appliance support apparatus 130 may be made of a material such as polyacetal (POM), ABS resin (acrylonitrile-butadiene-styrene resin), or another type of engineering plastic, or alternatively of a metal such as steel or stainless steel. In this case, the support part 131 and the weight part 132 can be made of the same material, though it should be obvious that the weight part 132 may be made of a heavier material than the support part 131. It is also possible for one of the support part 131 and the weight part 132 to be made of metal and for the other to be made of plastic.

As shown in FIGS. 18A and 18B, the card-like electronic appliance support apparatus 130 may be placed upon a support surface 145 that is horizontal or approximately horizontal. The card-like electronic appliance support apparatus 130 is used by hanging a desired number of card-like electronic appliance holders 20 to 120 from the support part 131 of the card-like electronic appliance holder 130.

In FIG. 18A, the mark 1A shows a small-size semiconductor storage medium. This small-size semiconductor storage medium 1A is a miniaturized form of the standard-sized semiconductor storage medium 1, and while the length of the semiconductor storage medium is greatly reduced, only a small reduction is made in the width and thickness of the semiconductor storage medium. In terms of functions and performance, there is no difference from a standard-sized semiconductor storage medium.

This small-sized semiconductor storage medium 1A may be held in the appliance insertion hole 23 of the card-like electronic appliance holders 20 to 130 by providing an adapter. Also, an original card-like electronic appliance holder 147 with an appliance insertion hole whose size matches the small-sized semiconductor storage medium 1A may be provided.

A card-like electronic appliance holder 20 to 120 in which the semiconductor storage medium 1 or small-sized semiconductor storage medium 1A is held may be hung from the suspended part 131a by inserting the suspended part 131a into the through-hole 24 of the support part 22 or by opening the notch 26 and inserting the suspended part 131a into the through-hole 24.

When removing a desired holder from this hanging state, in order to take the desired holder off the end part of the suspended part 131a, all of the holders placed closer to the end part than the desired holder have to be removed. On the other hand, by opening the notch in the desired holder, only the desired holder can be removed. In the same way, by opening the notch, a holder can be hung from the suspended part 131a at a desired position.

When doing so, for the embodiments (shown in FIGS. 1, 2, 3, 4, and 7) where one of the arm segments can be bent and elastically deformed inwards, the notch can be opened by pressing the suspended part 131a of the support part 131 against this arm segment, so that the user can attach a holder with one hand.

In the case of other embodiments (shown in FIGS. 3 and 6) where one of the arm segments can be bent and elastically deformed outwards, the notch can be opened by pulling the arm segment using the suspended part 131a of the support part 131, so that the user can take off or take out a holder 41 with one hand. In this way, the user can make one-touch operations for the holder 41 with one hand.

FIG. 17 shows the usage of a card-like electronic appliance holder 150 that includes a holder main body 151 with an appliance insertion hole 152 that corresponds to the terminal part 16 of the semiconductor storage medium 14 shown in FIG. 16. The appliance insertion hole 152 includes a terminal storing part 152a in which the terminal part 16 is inserted and a main part storing part 152b that is linked to the terminal storing part 152a.

The terminal storing part 152a of the appliance insertion hole 152 is a smaller hole than the main part storing part 152b, and an opening 152c that is open to the outside is set at the other end of the main part storing part 152b. A stepped part 153 is set between the terminal storing part 152a and the main part storing part 152b, and a convex part 154 is formed inside the main part storing part 152b. As a support part, a hanging ring 155 is provided on a surface on the opposite side of the opening 152c of the holder main body 151. The remaining part of the construction is the same as with the holder 20 etc., and so is not described.

With the card-like electronic appliance holder 150 of the present embodiment, when the semiconductor storage medium 14 is inserted into the appliance insertion hole 152, the convex part 154 fits into the concave part 5, thereby holding the semiconductor storage medium 14. When doing so, the stepped part 153 is present between the terminal storing part 152a and the main part storing part 152b, so that the stepped part 18 of the semiconductor storage medium 14 strikes the stepped part 153, thereby stopping the semiconductor storage medium 14 from being inserted any further. As a result, by setting the height L of the projecting bar part 17 in advance so as to be less than the depth L0 of the terminal storing part 152a, the front of the terminal part 16 can be kept from striking the base surface of the terminal storing part 152a even when the semiconductor storage medium 14 is strongly pressed in, thereby protecting the terminal part 16 from damage due to insertion operations.

The semiconductor storage medium 14 can be removed from the card-like electronic appliance holder 150 for use by merely pulling the semiconductor storage medium 14 in the removal direction, i.e., towards the opening 152c. This results in the side wall of the holder main body 151 bending outwards slightly, thereby removing the convex part 154 from the concave part 5 provided in the external case 15. As a result, the engagement (locking) of the concave part 5 and the convex part 154 is released, so that the semiconductor storage medium 14 can be quickly and easily removed.

The following describes, with reference to FIGS. 19 to 41, card-like electronic appliance holders and card-like electronic appliance support apparatuses that have a linking means for linking card-like electronic appliance holders of the same type.

FIGS. 19 to 22 show a thirteenth embodiment of a card-like electronic appliance holder according to the present invention. As shown in FIGS. 19A and 19B, the card-like electronic appliance holder 160 has a holder main body 161 that has an appliance insertion hole 162 in which the terminal part 7 of the semiconductor storage medium 1 is inserted. The holder main body 161 is a flattened cube or rectangular solid that is hollow and slimline and has an opening 162a for the appliance insertion hole 162 provided in one of the four sides of reduced width.

The appliance insertion hole 162 is formed so to correspond to the terminal part 7 of the semiconductor storage medium 1 in size and shape and is made sufficiently deep so as to cover a predetermined part of the terminal part 7. A convex part 163 that engages the concave part 5 provided in the semiconductor storage medium 1 and holds the semiconductor storage medium 1 is provided in the inside of the appliance insertion hole 162. To do so, the convex part 163 is provided at a position that corresponds to the concave part 5 when the semiconductor storage medium 1 has been inserted to as far as the predetermined position in the appliance insertion hole 162.

A linking means 164 for detachably linking the card-like electronic appliance holder 160 to another card-like electronic appliance holder 160 of the same type is provided on the two wide flat surface parts 161a, 161b of the holder main body 161 that face one another sandwiching the appliance insertion hole 162. This linking means 164 is composed of a combination of linking convex parts 164a that are formed on the first flat surface part 161a and linking concave parts 164b that are formed on the second flat surface part 161b.

The linking convex parts 164a of the linking means 164 are composed of four cylindrical protrusions of equal size that are arranged at equal intervals in the four corners of the first flat surface part 161a. The linking concave parts 164b of a linking means 164 are composed of four square depressions of equal size that are arranged at equal intervals in the four corners of the second flat surface part 164b so as to correspond to the four linking convex parts 164a.

The lengths of the sides of the linking concave parts 164b are set slightly smaller than the diameter of the linking convex parts 164a, so that by elastically deforming the linking convex parts 164a slightly, the linking convex parts 164a can be fitted into the linking concave parts 164b so as to engage the linking concave parts 164b. In this way, by applying a certain amount of pressure to the linking convex parts 164a to connect the linking convex parts 164a to the linking concave parts 164b, two holders 160 can be reliably and strongly joined together.

FIG. 20A is a cross-sectional view of the card-like electronic appliance holder that is illustrated in FIGS. 19A and 19B. A base part of the convex part 163 is fixed to a side surface part in one of the four corners of the appliance insertion hole 162, and is formed so the front side of the semi-circular end surface is parallel with the second flat surface part 161b. The construction of the convex part 163 is not limited to this, however, so that for example the base part may be fixed to the second flat surface part 161b and the front side of the curved surface may be parallel with the side surface part.

In place of the convex part 163 shown in FIG. 20A, a convex part may be provided in a corner that lies on the same diagonal as the convex part 163. Also, as shown in FIG. 20B, convex parts 163, 163a may be provided at two positions on a diagonal. In this case, the semiconductor storage medium 1 can be inserted into the appliance insertion hole 162 with either the top or the bottom facing upwards, though in this case it becomes necessary to provide concave parts 5 at two positions on the external case 2.

Figure 21A:
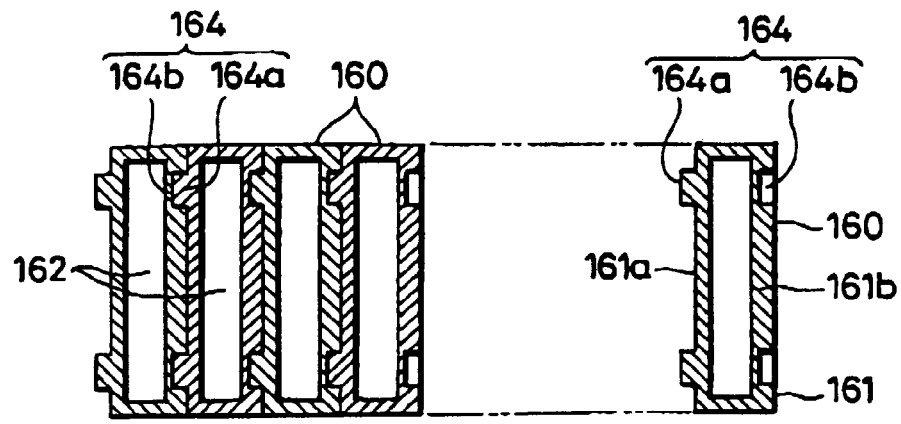
FIG. 21 shows the thirteenth embodiment of the card-like electronic appliance holder according to the present invention, with FIG. 21A being a cross-sectional view for a case where a plurality of card-like electronic appliance holders have been arranged in a row, FIG. 21B being a cross-sectional view for a case where the arrangement of the holders resembles a cross-stitch pattern, and FIG. 21C being a cross-sectional view for a case where the holders are arranged on a diagonal.
Figure 21B:
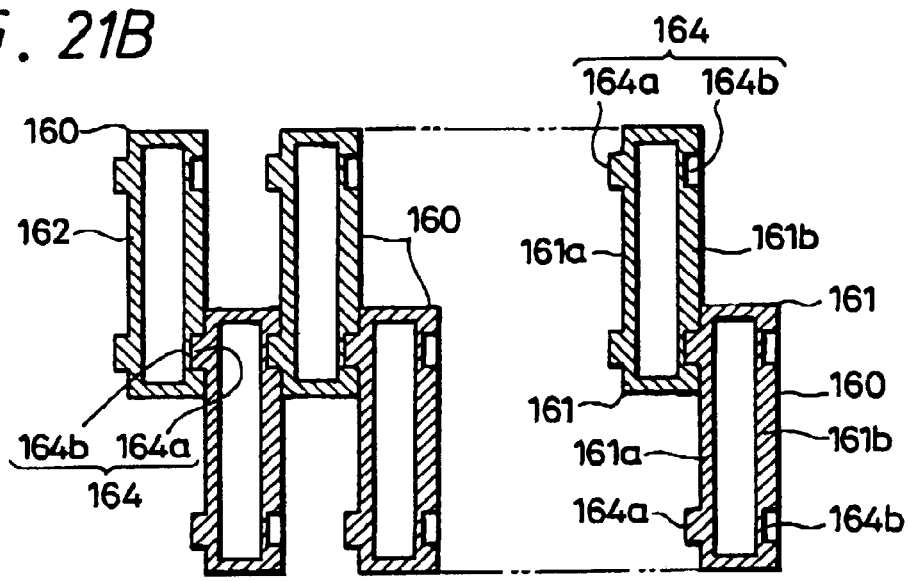
Figure 21C:
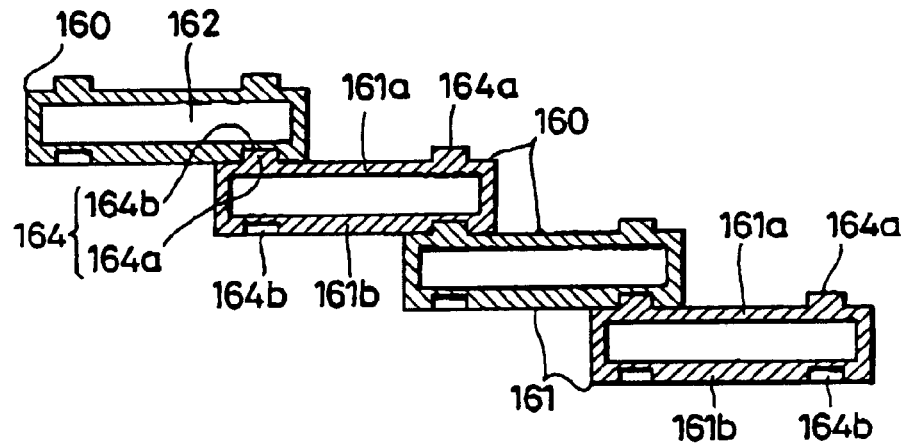

FIGS. 21A to 21C show the present embodiment for cases where a plurality of the card-like electronic appliance holders 160 shown in FIGS. 19A and 19B have been linked together using the linking means 164. In more detail, FIG. 21A shows the case where a plurality of card-like electronic appliance holders 160 have been aligned in the width direction, with card-like electronic appliance holders 160 that are adjacent in the front-rear direction being linked together by their respective linking means 164 to produce an arrangement of linked holders. By linking a plurality of card-like electronic appliance holders 160 together in this arrangement, the arrangement of linked holders can be made stable, so that a plurality of card-like electronic appliance holders 160, each of which has a narrow width and so lacks upright stability, can be stably aligned in an upright state.

FIG. 21B shows the case where a plurality of card-like electronic appliance holders 160 have been aligned in the width direction in a cross-stitch-type pattern where each card-like electronic appliance holder 160 is shifted sideways in alternating directions, with card-like electronic appliance holders 160 that are adjacent in the front-rear direction being linked together by their respective linking means 164 to produce an arrangement of linked holders. By linking a plurality of card-like electronic appliance holders 160 together in this arrangement, the contact area of the base surfaces is increased, making the arrangement even more stable.

FIG. 21C shows the case where a plurality of card-like electronic appliance holders 160 have been aligned in the width direction with each card-like electronic appliance holder 160 being shifted sideways in the same direction, with card-like electronic appliance holders 160 that are adjacent in the front-rear direction being linked together by their respective linking means 164 to produce an arrangement of linked holders. By linking a plurality of card-like electronic appliance holders 160 together in this arrangement, the entire arrangement of holders can be made stable, and the label surfaces of the semiconductor storage media 1 that are held in the card-like electronic appliance holders 160 can be simultaneously seen, so that the user can soon find a desired semiconductor storage medium 1.

Figure 22A:
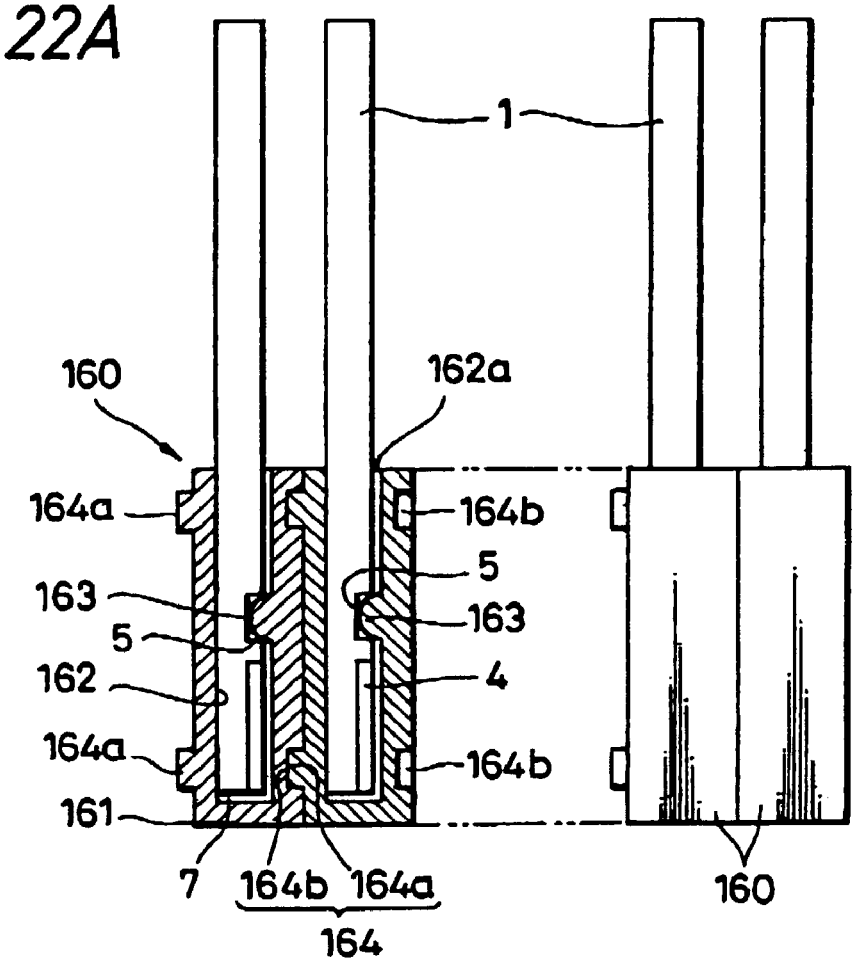
FIG. 22 shows the thirteenth embodiment of the card-like electronic appliance holder according to the present invention, with FIG. 22A being a side view (partially in cross section) for a case where a plurality of card-like electronic appliance holders have been linked together and FIG. 22B being a frontal view of when a card-like electronic appliances has been attached.
Figure 22B:
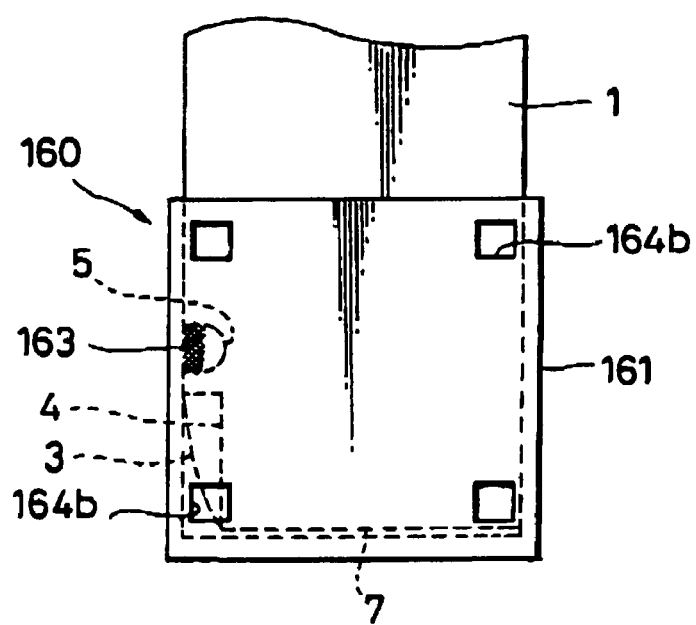

FIGS. 22A and 22B show how semiconductor storage media 1 are held by the respective card-like electronic appliance holders 160 in the arrangement of holders shown in FIG. 21A. The following is one example of how the card-like electronic appliance holders 160 with the construction described above can be used.

To insert a semiconductor storage medium 1 into a card-like electronic appliance holder 160, the user inserts the terminal part 7 side of the semiconductor storage medium 1 into the appliance insertion hole 162. The external case 2 slides over the convex part 163 of the card-like electronic appliance holder 160 and the convex part 163 of the card-like electronic appliance holder 160 fits into the concave part 5 in the external case 2. As a result, the semiconductor storage medium 1 is held in the card-like electronic appliance holder 160 by the engagement between the convex part 163 and the concave part 5.

On the other hand, a semiconductor storage medium 1 can be removed from the card-like electronic appliance holder 160 for usage by pulling the semiconductor storage medium 1 in the removal direction, i.e., towards the opening 162a. This results in the flat surface parts 161a, 161b and the convex part 163 of the holder main body 161 bending and deforming slightly outwards, thereby removing the convex part 163 from the concave part 5 provided in the external case 2. As a result, the engagement (locking) of the concave part 5 and the convex part 164 is released, so that the semiconductor storage medium 1 can be quickly and easily removed.

Figure 23:
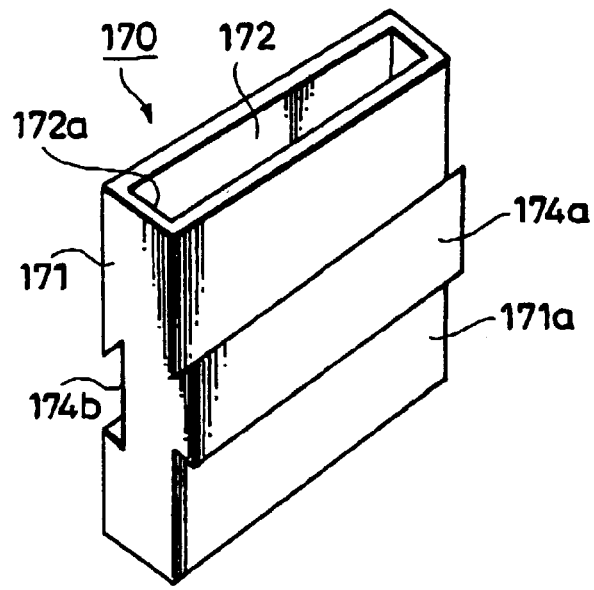
FIG. 23 is a perspective view showing a fourteenth embodiment of a card-like electronic appliance holder according to the present invention.
Figure 24:
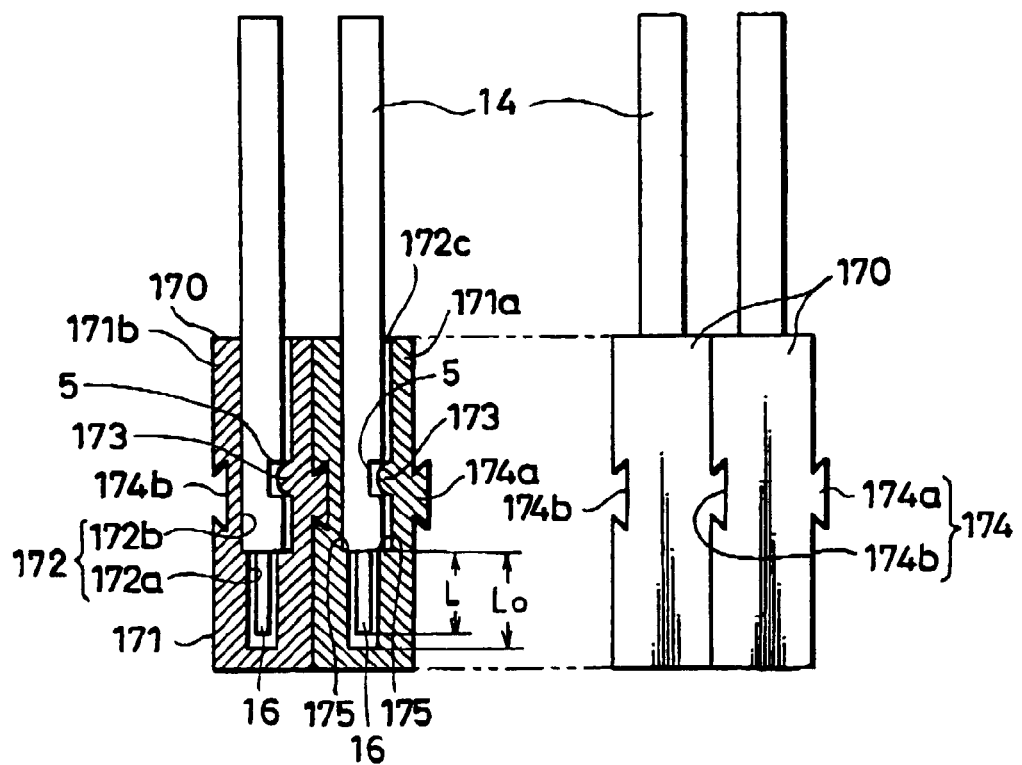
FIG. 24 is a side view, partially in cross-section, showing a state where a plurality of card-like electronic appliance holders according to the fourteenth embodiment of the present invention have been connected.

FIGS. 23 and 24 show a fourteenth embodiment of a card-like electronic appliance holder according to the present invention. A card-like electronic appliance holder 170 has an appliance insertion hole 172 to which the semiconductor storage medium 14 of the second embodiment shown in FIG. 16 can be attached, and uses a dovetail joint 174 as the second embodiment of the linking means.

The appliance insertion hole 172 of the holder main body 171 has a shape that corresponds to the shape of the terminal part 16 of the semiconductor storage medium 14. In more detail, as shown in FIG. 23, the appliance insertion hole 172 has a terminal storing part 172a, in which the terminal part 16 is inserted, and a main part storing part 172b that is linked to the terminal storing part 172a. The terminal storing part 172a is an aperture that is smaller than the main part storing part 172b. An opening 172c that is open to the outside is provided at the other end of the main part storing part 172b. A stepped part 175 is also provided between the terminal storing part 172a and the main part storing part 172b, and a convex part 173 is provided on the inside of the main part storing part 172b.

The linking means (dovetail joint) 174 is composed of a combination of a dovetail tenon 174a provided on the first flat surface part 171a of the holder main body 171 and a dovetail mortise 174b formed in the second flat surface part 171b. The dovetail tenon 174a of the linking means 174 is composed of a projecting bar with a dovetail-shaped cross-section, with this projecting bar being formed continuously across the width of the first flat surface part 171a in an approximately central part. The dovetail mortise 174b that is the other part of the linking means is composed of groove part where a dovetail-shaped concave part is formed continuously across the width of the second flat surface part 171b in an approximately central part so as to be parallel with the dovetail tenon 174a.

FIG. 24 shows how a plurality of the card-like electronic appliance holders 170 shown in FIG. 23 are linked together using the linking means 174 to compose an arrangement of linked holders and how semiconductor storage media 14 are held by the respective card-like electronic appliance holders 170 in this holder arrangement. The operation for linking two card-like electronic appliance holders 170 can be performed as described below, for example.

First, two card-like electronic appliance holders 170 are placed facing one another with their widths aligned, and the dovetail tenon 174a of one of the card-like electronic appliance holders 170 is aligned with the dovetail mortise 174b of the other. Next, the dovetail tenon 174a is placed into the dovetail mortise 174b and slid in the width direction so that positions of the two card-like electronic appliance holders 170 correspond in the front-rear direction. By doing so, the two card-like electronic appliance holders 170 are linked to one another. By repeating this linking operation a required number of times, a desired number of card-like electronic appliance holders 170 can be linked together in a holder arrangement.

When a semiconductor storage medium 14 is inserted into the appliance insertion hole 172 of a card-like electronic appliance holder 170, the convex part 173 fits into the concave part 5 of the external case 15 of the semiconductor storage medium 14, resulting in the semiconductor storage medium 14 being held. A stepped part 175 is provided between the terminal storing part 172a and the main part storing part 172b, so that the stepped part 18 of the semiconductor storage medium 14 strikes the stepped part 175 and stops the semiconductor storage medium 14 from being inserted any further. As a result, by setting the height L of the projecting bar part 17 in advance so as to be less than the depth L0 of the terminal storing part 172a, the front of the terminal part 16 can be kept from striking the base surface of the terminal storing part 172a even when the semiconductor storage medium 14 is strongly pressed in, thereby protecting the terminal part 16 from damage due to insertion operations.

The semiconductor storage medium 14 can be removed from the card-like electronic appliance holder 170 for use by merely pulling the semiconductor storage medium 14 in the removal direction. When doing so, the convex part 173 provided in the holder main body 170 is removed from the concave part 5 provided in the external case 15. As a result, the engagement of the concave part 5 and the convex part 173 is released, so that the semiconductor storage medium 14 can be quickly and easily removed.

Figure 25:
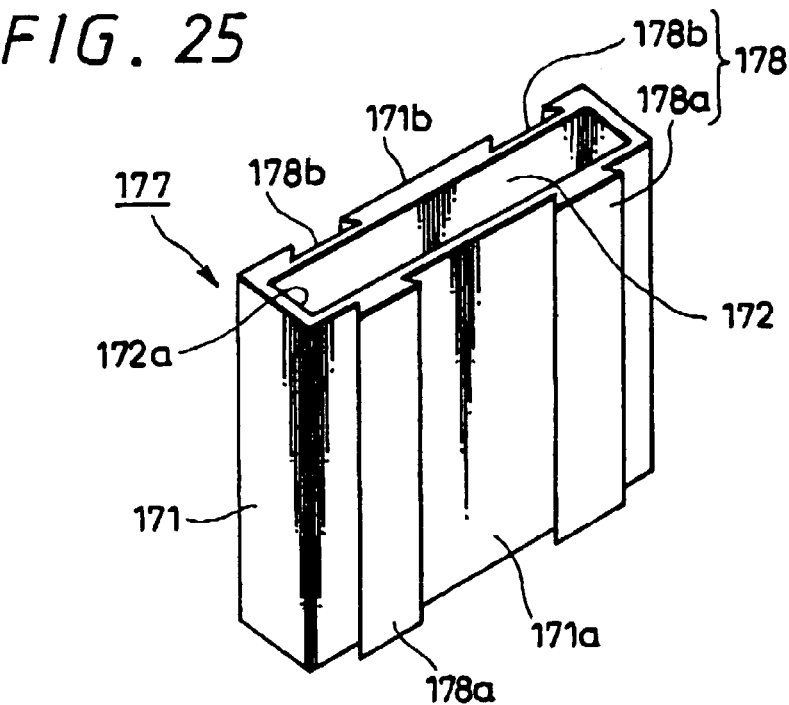
FIG. 25 is a perspective view showing a fifteenth embodiment of a card-like electronic appliance holder according to the present invention.

FIG. 25 shows a card-like electronic appliance holder 177 according to a fifteenth embodiment of the present invention which is a modification of the linking means of the card-like electronic appliance holder 170 according to the fourteenth embodiment that is shown in FIG. 23, and includes a linking means 177 with two dovetail joints. This card-like electronic appliance holder 177 differs from the card-like electronic appliance holder 170 only in the linking means, so that the following describes the linking means 178, with the other parts that are the same being given the same reference numerals and not being explained.

Two dovetail tenons 178*a* are provided on the first flat surface part 171*a* of the holder main body 171 and two dovetail mortises 178*b* are provided in the second flat surface part 171*b*. The two dovetail tenons 178*a* are provided so as to extend in the vertical direction and are parallel in the width direction with a predetermined gap between them. The opening 172*a* is provided for the appliance insertion hole 172 at one end of the direction in which the two dovetail tenons extend. Corresponding to the two dovetail tenons 178*a*, the two dovetail mortises 178*b* extend parallel to one another in the vertical direction.

With the present embodiment, two card-like electronic appliance holders 177 are linked by the linking means 178 that are composed of two dovetail joints, so that the coupling strength of the two card-like electronic appliance holders 177 is increased and the holders are strongly linked together. It should be noted that the linking means may be composed of three or more dovetail joints, and that both dovetail tenons 178*a* and dovetail mortises 178*b* may be formed on both sides of the holder main body 171.

The card-like electronic appliance holder 180 according to a sixteenth embodiment of the present invention shown in FIGS. 26A, 26B, 27, and 28 includes a linking means 183 composed of a T-shaped projection 184 and an engaging groove/rotation hole arrangement 185. The card-like electronic appliance holder 180 differs from the card-like electronic appliance holder 170 only in the linking means, so that the following describes the linking means 183, with the other parts that are the same being given the same reference numerals and not being explained.

Figure 26A:
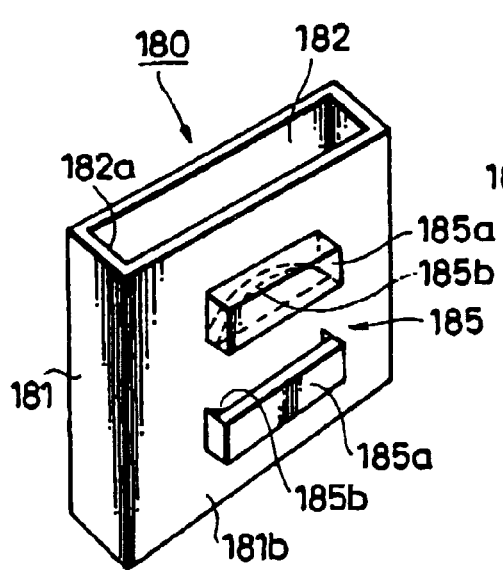
FIG. 26 shows a sixteenth embodiment of a card-like electronic appliance holder according to the present invention, with FIG. 26A being a perspective view of one surface seen from the left side and FIG. 26B being a perspective view of another surface seen from the right side.
Figure 26B:
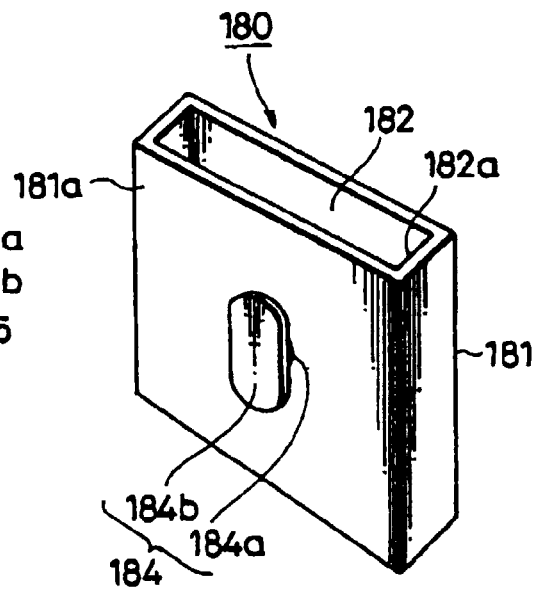
Figure 27A:
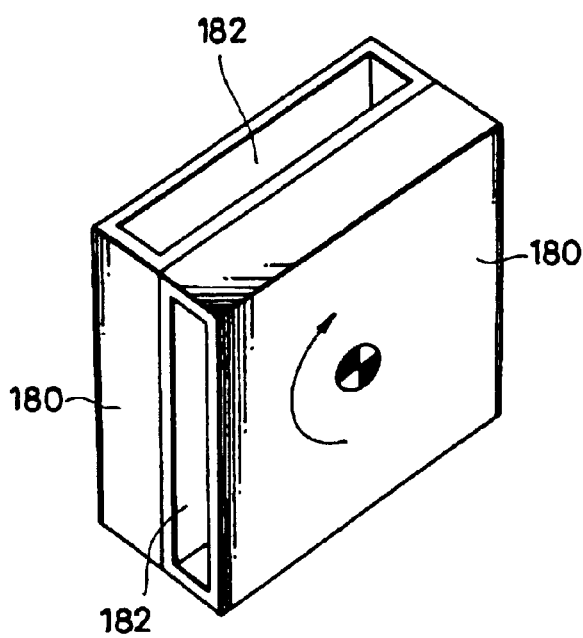
FIG. 27 shows the sixteenth embodiment of the card-like electronic appliance holder according to the present invention, with FIG. 27A being a perspective view of a state where two holders have been linked together and FIG. 27B being a cross-sectional view of the linking means.
Figure 27B:
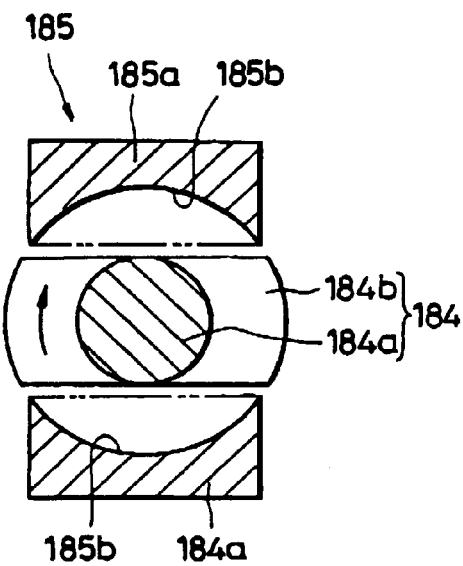

As shown in FIGS. 26A and 26B, a T-shaped projection 184 is provided in an approximately central part of a first flat surface part 181*a* of the holder main body 181 and a pair of guide rails 185*a*, 185*a* is provided corresponding to the T-shaped projection 184 on the second flat surface part 181*b*. The T-shaped projection 184 includes a rotational shaft part 184*a* that is set in an approximately central part and a flange part 184*b* that continues from an end surface of the rotational shaft part 184*a* and projects outward in a diameter direction. The flange part 184*b* extends parallel to the direction in which the appliance insertion hole 182 extends, and the ends of both protruding parts are rounded into the shape of semicircles.

On the other hand, the two guide rails 185*a*, 185*a* are disposed in parallel with a gap between them that is approximately equal to the width of the T-shaped projection 184. A revolution hole 185*b* that allows the flange part 184*b* to rotate is provided on the insides of the attachment base parts of these guide rails 185*a*, 185*a*, which is to say, on inside surfaces of the parts that are linked to the second flat surface part 81*b* of the holder main body 181.

The operation for linking two card-like electronic appliance holders 180 of the present embodiment together can be performed as follows, for example. First, the T-shaped projection 184 of one card-like electronic appliance holder 180 is fitted between the pair of guide rails 185*a*, 185*a* of the other card-like electronic appliance holder 180. This is the state shown in FIGS. 27A and 27B. After this, one of the card-like electronic appliance holders 180 is held and the other card-like electronic appliance holder 180 is rotated by 90° clockwise (or anticlockwise) about the center of the rotational shaft part 184*a* so that the openings 182*a* of the two card-like electronic appliance holders 180 face in the same direction.

Figure 28:
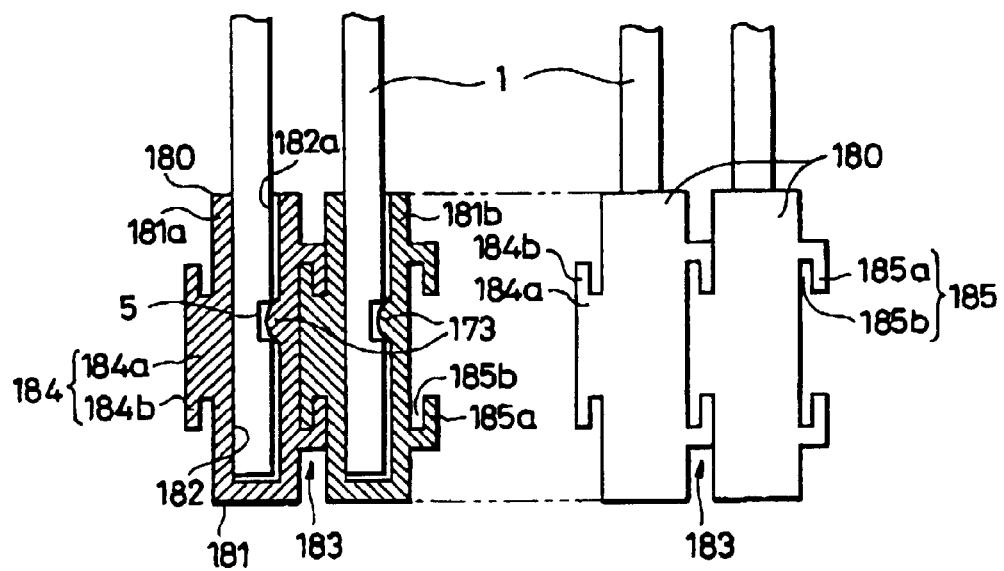
FIG. 28 is a side view, partially in cross-section, of a plurality of card-like electronic appliance holders according to the sixteenth embodiment of the present invention that have been linked together.

As a result, the flange part 184*b* of the T-shaped projection 184 of one card-like electronic appliance holder 180 engages the rotation holes 185*b* of the other card-like electronic appliance holder 180. By means of the T-shaped projection 184 and the pair of guide rails 185*a*, 185*a*, the linking means 183 links two card-like electronic appliance holders 180 together. By repeating this linking operation a required number of times, a desired number of card-like electronic appliance holders 180 can be linked together to form a holder arrangement as shown in FIG. 28. The operation for inserting a semiconductor storage medium 1 into the appliance insertion hole 182 of a card-like electronic appliance holder 180 is the same as in the embodiments described earlier, and so is not explained here.

The card-like electronic appliance holder 190 according to a seventeenth embodiment of the present invention shown in FIGS. 29A, 29B, and 30 is a modification of the linking means of the card-like electronic appliance holder 180 according to a sixteenth embodiment of the present invention shown in FIGS. 26 etc., and includes a linking means 193 composed of a T-shaped projection 194 and a rotation hole/guide groove arrangement 195. The card-like electronic appliance holder 190 differs from the card-like electronic appliance holder 180 only in the linking means, so that the following describes the linking means 193, with the other parts that are the same being given the same reference numerals and not being explained.

As shown in FIGS. 29A and 29B, a T-shaped projection 194 is provided in an approximately central part of a first flat surface part 191*a* of the holder main body 191 and a rotation hole/guide groove arrangement 195 is provided corresponding to the T-shaped projection 194 on the second flat surface part 191*b*. The T-shaped projection 194 includes a rotational shaft part 194*a*, which has a large diameter and is set in an approximately central part, and a flange part 194*b* that continues from an end surface of the rotational shaft part 194*a* and projects outward in a diameter direction. The flange part 194*b* extends parallel to the direction in which the appliance insertion hole 192 extends, and the ends of both protruding parts are rounded into the shape of semicircles.

The rotation hole/guide groove arrangement 195 has a slit part 195*a* that has a width that is approximately equal to the width of the flange part 194*b* of the T-shaped projection 194 and an engagement hole 195*b* that is provided in a central part of the slit part 195*a* and engages the rotational shaft part 194*a*. Rotation holes 195*c* for allowing the flange part 194*b* to rotate are also formed in base parts where the slit part 195*a* meets the engagement hole 195*b*, at positions that exhibit point symmetry.

The rotation hole 195*c* is formed so that when the T-shaped projection 194 has been rotated by 90°, the flange part 194*b* of the T-shaped projection 194 strikes stopper parts 195*d* formed in the base. By rotating the T-shaped projection 194 until it strikes these stopper parts 195*d*, one card-like electronic appliance holder 190 can be positioned relative to another card-like electronic appliance holder 190 at a position where it has been rotated by 90°. By using this construction, the same effects can be obtained as with the sixteenth embodiment described above.

Figure 31A:
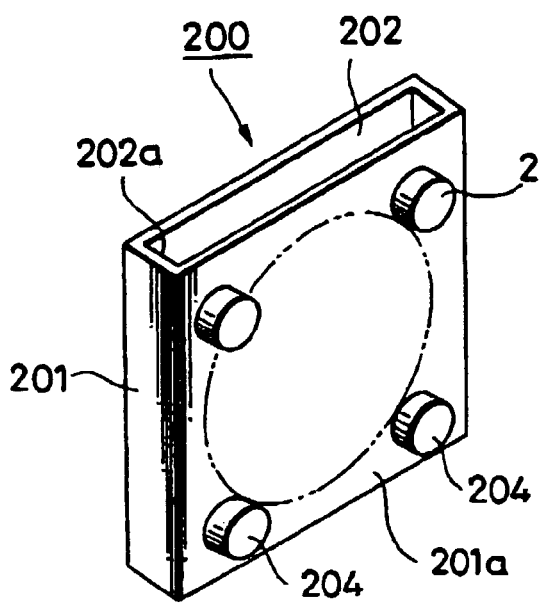
FIG. 31 shows an eighteenth embodiment of a card-like electronic appliance holder according to the present invention, with FIG. 31A being a perspective view of one surface seen from the right side and FIG. 31B being a perspective view of another surface seen from the left side.
Figure 31B:
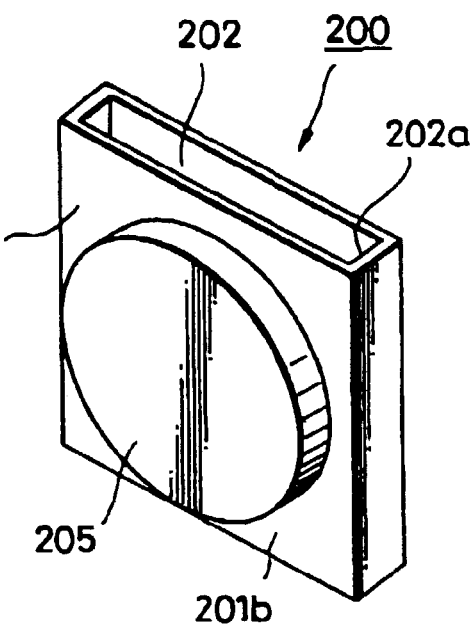
Figure 32:
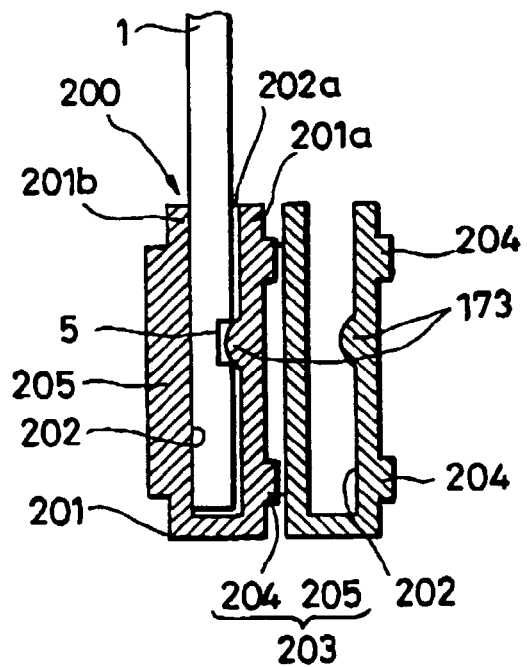
FIG. 32 is a cross-sectional view of the linking means that links together two card-like electronic appliance holders according to the eighteenth embodiment of the present invention.

A card-like electronic appliance holder 200 according to an eighteenth embodiment of the present invention is shown in FIGS. 31A, 31B, and 32, and includes a linking means 203 that is a combination of a convex part and other convex parts. This card-like electronic appliance holder 200 differs from the card-like electronic appliance holder 160 of the thirteenth embodiment only in the linking means, so that the linking means 203 is described below, with the other parts being given the same reference numerals and not being described.

As shown in FIGS. 31A and 31B, the linking means 203 is composed of a combination of linking convex parts 204 that are provided on a first flat surface part 201a of the holder main body 201 and a linking convex part 205 provided on a second flat surface part 201b. The linking convex parts 204 of the linking means 203 are composed of four cylindrical protrusions that are of equal size and are arranged at equal intervals in the four corners of the first flat surface part 201a. The linking convex part 205 of the linking means 203 is formed of a single cylindrical protrusion that has a large diameter. This second linking convex part 205 is of a suitable size to fit between and engage the four linking convex parts 204.

In the present embodiment, the first and second convex parts 204 and 205 are held together by squeezing force imparted on the single second linking convex part 205 by the four first linking convex parts 204. As a result, as shown in FIG. 32, two card-like electronic appliance holders 200 are reliably held together. The two card-like electronic appliance holders 200 can also be rotated while engaging one another. Accordingly, within a revolution of 360°, the openings 202a of the card-like electronic appliance holders 200 can be rotated and aligned at a desired angle.

Figure 33:
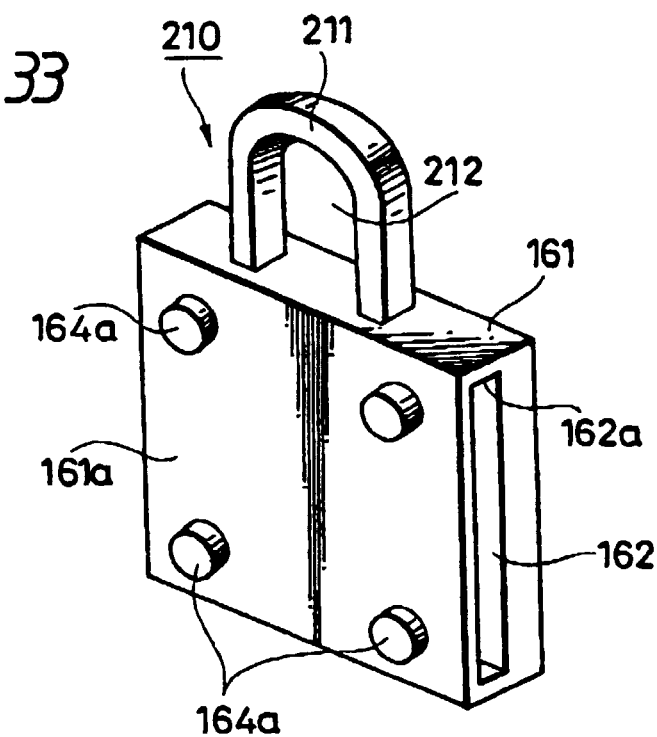
FIG. 33 is a perspective view showing a nineteenth embodiment of a card-like electronic appliance holder according to the present invention.

A card-like electronic appliance holder 210 according to a nineteenth embodiment of the present invention shown in FIG. 33 is a card-like electronic appliance holder 160 according to the thirteenth embodiment that is shown in FIG. 19 with the addition of a holder 211 that is a support part 211 for hanging the card-like electronic appliance holder 160.

The holder main body 161 of the card-like electronic appliance holder 210 has a similar construction to the holder main body 161 shown in FIG. 19 or the like, and is equipped with an opening 162a for the appliance insertion hole 162 on one side of the case that is in the form of a flattened cube. Four linking convex parts 164a that compose part of the linking means 164 are formed on a first flat surface part 161a of the holder main body 161. Also, four linking concave parts that composed the other part of the linking means are formed on the other flat surface part of the holder main body 161 that cannot be seen in FIG. 33.

The holder 211 that is the support part of the card-like electronic appliance holder 160 is bent into a U shape, with the opening within the holder 211 being the through-hole 212. The holder 211 is integrally provided on a side surface that is perpendicular to the surface of the holder main body 161 in which the opening 162a is formed. By using the holder 211, the card-like electronic appliance holder 160 can be hung from a hook or the like that is attached to a wall, for example. The remaining parts of the construction are the same as before and so are not described.

Figure 34:
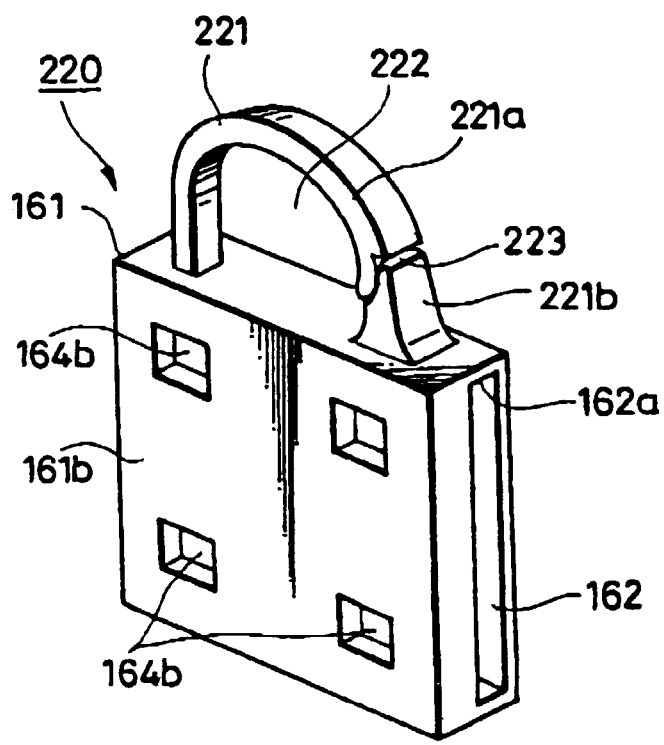
FIG. 34 is a perspective view showing a twentieth embodiment of a card-like electronic appliance holder according to the present invention.

A card-like electronic appliance holder 220 according to a twentieth embodiment of the present invention shown in FIG. 34 has a notch 223 for opening and closing the holder 221 formed in the holder 221 of the card-like electronic appliance holder 220 according to the nineteenth embodiment that is shown in FIG. 33. The holder main body 161 has the same construction as the holder main body 161 shown in FIG. 33, and has an opening 162a for the appliance insertion hole 162 in one of the side surfaces of the flattened cube. Four linking convex parts that form one part of the linking means are formed on a side of a flat surface part of the holder main body 161 that cannot be seen in FIG. 34, and four linking concave parts 164b that form the other part of the linking means are formed in the other flat surface part 164b.

The holder 221 is formed in a u shape, with the opening formed within the holder 221 being the through-hole 222. The holder 221 is integrally provided on a side surface that is perpendicular to the surface of the holder main body 161 in which the opening 162a is formed. The notch 223 is formed near the base part of the holder 221 on the same side as the opening 162a. Due to the presence of the notch 223, a first arm segment 221a and a second arm segment 221b are formed in the holder 221.

The end parts of the first and second arm segments 221a, 221b are in contact and overlap slightly in the internal-external direction, and are constructed so that the notch 223 is closed in its natural state. In the present embodiment, either of the first and second arm segments 221a and 221b may be provided with elasticity so as to be flexible, or alternatively both the first and second arm segments 221a and 221b may be provided with elasticity so as to be flexible.

Figure 35:
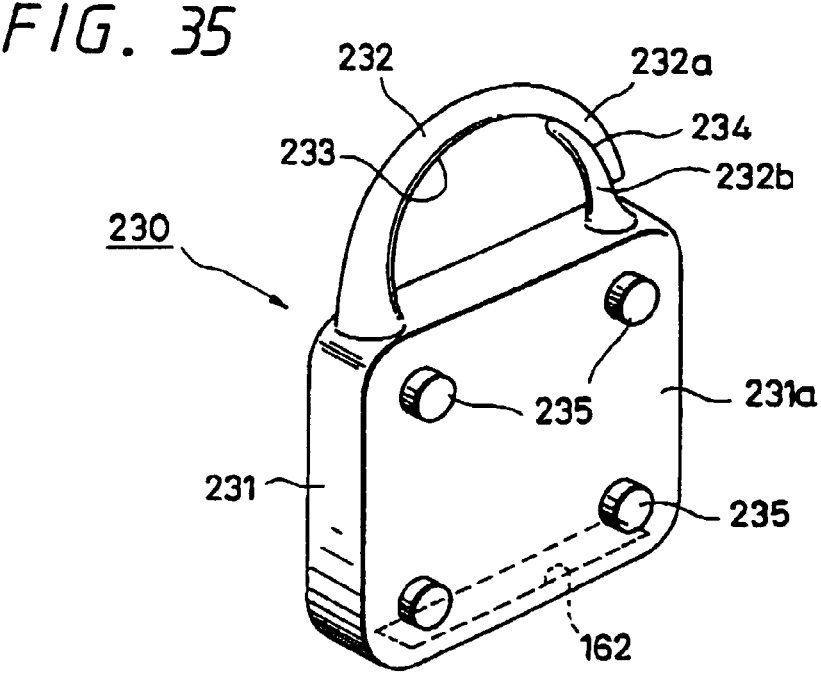
FIG. 35 is a perspective view showing a twenty-first embodiment of a card-like electronic appliance holder according to the present invention.

A card-like electronic appliance holder 230 according to a twenty-first embodiment of the present invention shown in FIG. 35 is a variation of the notch shown in FIG. 34. The end parts of the first arm segment 232a and the second arm segment 232b of the holder 232 that is the support part are tapered and overlap in the internal-external direction, with the overlapping part forming the notch 234.

The holder 232 is integrally formed on a surface on the opposite side of the opening of the appliance insertion hole 162 of the holder main body 231, with the inside of the holder 232 being set as the through-hole 233. Four convex parts 235 that form part of the linking means are formed on one flat surface part 231a of the holder main body 231, while four concave parts that form the other part of the linking means are formed on the other flat surface part that cannot be seen in FIG. 35.

A card-like electronic appliance holder 240 according to the twenty-second embodiment of the present invention shown in FIGS. 36A, 36B, 37A, and 37B has a hanging ring 243 attached in a rotatable manner to the holder main body 241 as another embodiment of a support part. In more detail, the card-like electronic appliance holder 240 includes a holder main body 241 with an appliance insertion hole 162, in which the terminal part 7 of a semiconductor storage medium 1 is inserted, and a hanging ring 243 that has a through-hole 24 for hanging the holder main body 241.

The holder main body 241 is composed of a hollow case in the form of a flattened cube, with an opening 162a for the appliance insertion hole 162 being provided in one of the four sides of reduced width. Four convex linking parts 242a that form part of the linking means are provided on one of the flat surface parts of the holder main body 241. A hanging ring storage part 245 composed of a recessed part in which the hanging ring 243 can be stored and four linking concave parts 242b that form the other part of the linking means are provided in the other flat surface part of the holder main body 241.

The hanging ring storage part 245 has a shape that corresponds to the hanging ring 243, and includes a circular concave part 245a that is formed in an approximately central part and a linking concave part 245b that links the circular concave part 245a to a side on the opposite side of the appliance insertion hole 162 of the holder main body 241. The two surfaces of the linking concave part 245b are parallel and bearing holes that form a pair are formed in these two surfaces.

Figure 36A:
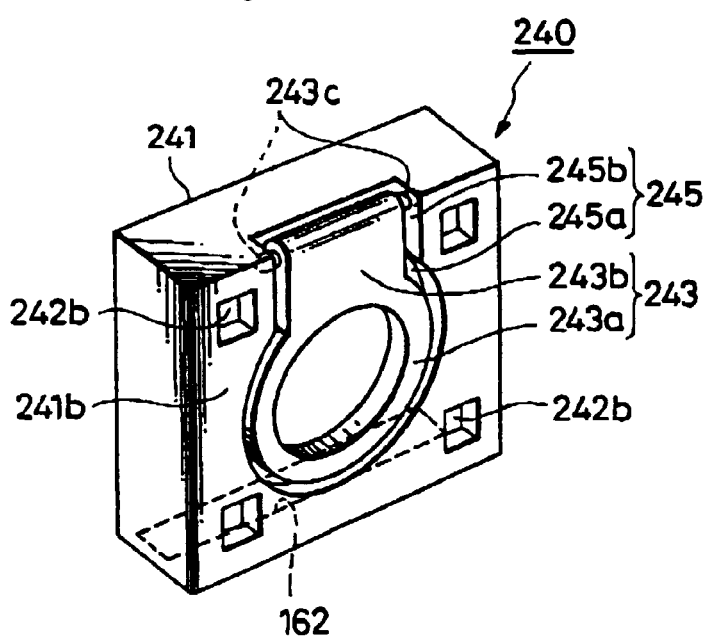
FIG. 36 shows a twenty-second embodiment of a card-like electronic appliance holder according to the present invention, with FIG. 36A being a perspective view showing the hanging ring in a closed state and FIG. 36B being a vertical cross-sectional view of the central part.
Figure 36B:
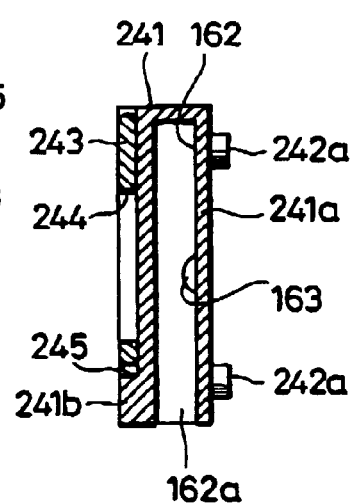
Figure 37A:
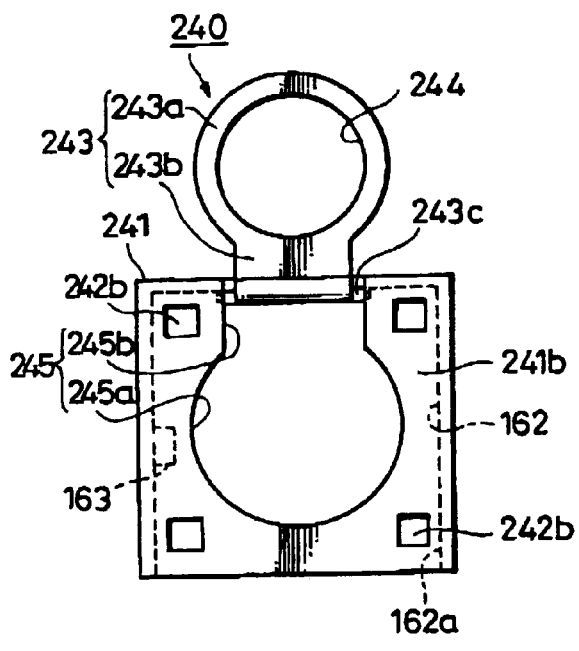
FIG. 37 shows the twenty-second embodiment of the card-like electronic appliance holder according to the present invention, with FIG. 37A being a frontal view showing the hanging ring in an open state and FIG. 37B being a side view of the same state.
Figure 37B:
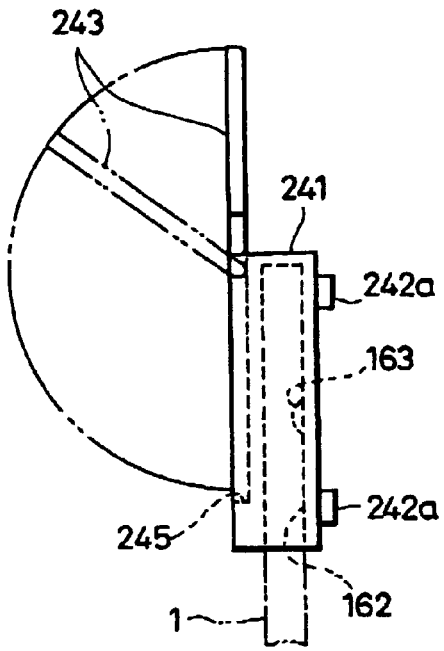

The hanging ring 243 is the same as the hanging ring in the holder 90 according to the eighth embodiment that is shown in FIG. 9 and is described above. In more detail, the hanging ring 243 has a ring part 243a and a base part 243b that is connected to part of the ring part 243a and projects outward. The base part 243b is provided with shaft parts 243c, 243c that lie on the same central axis line and project outwards in oppose directions from the base part 243b so as to diverge. The end parts of these shaft parts 243c, 243c engage a pair of bearing holes provided in the linking concave part 245b with the shaft parts 243c, 243c being free to rotate. The hanging ring 243 can be placed in a state in which the hanging ring 243 is stored in the hanging ring storage part 245 as shown in FIGS. 36A and 36B and in a state where the hanging ring 243 has been rotated by 180° and so projects from the opposite side of the opening 162a, as shown in FIGS. 37A and 37B.

Figure 38:
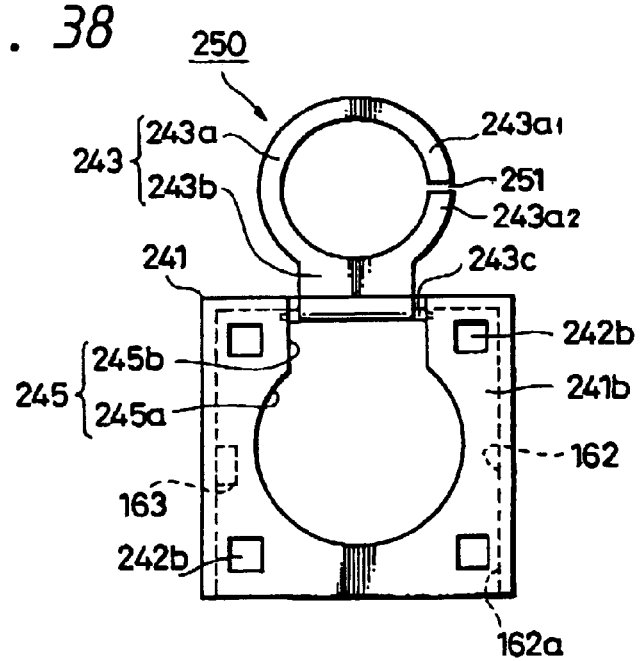
FIG. 38 is a frontal view of a twenty-third embodiment of a card-like electronic appliance holder according to the present invention with the hanging ring in an open state.

A card-like electronic appliance holder 250 according to the twenty-third embodiment of the present invention shown in FIG. 38 is the card-like electronic appliance holder shown in FIG. 36, etc., with a notch formed in the hanging ring 243. The hanging ring 243 has a ring part 243a and the base part 243b, and is provided with a straight notch 251 on one side of the ring part 243a. Due to the notch 251, the ring part 243a is formed with a first arm segment 243a1 and a second arm segment 243a2. The end parts of the first arm segment 243a1 and the second arm segment 243a2 are formed so as to face one another with a predetermined gap in between.

The other parts of the construction are the same as the card-like electronic appliance holder 240 that is described above, and so have been given the same reference numerals as before and are not described. By forming a notch 251 in the ring part 243a and providing the first arm segment 243a1 with elasticity so as to be flexible, the notch 251 can be opened by bending the first arm segment 243a1 outwards or inwards.

Figure 39A:
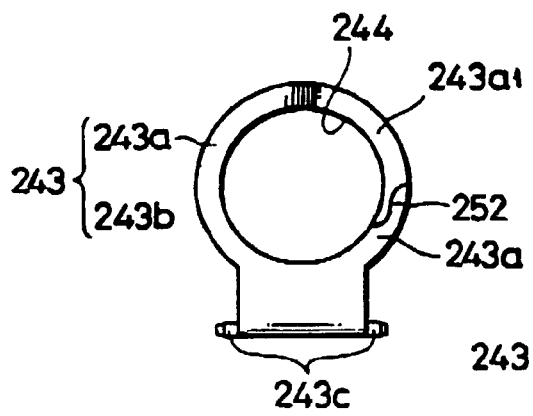
FIG. 39 shows other examples of a hanging ring for the twenty-third embodiment of the card-like electronic appliance holder according to the present invention, with FIG. 39A being a frontal view for a hanging ring including an S-shaped notch and FIG. 39B being a frontal view for a hanging ring including a Z-shaped notch.
Figure 39B:
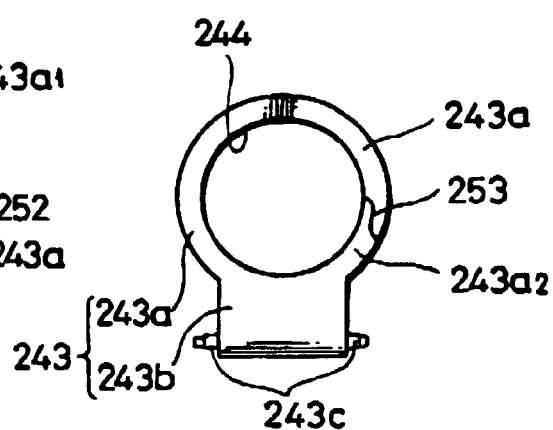

FIGS. 39A and 39B show a modification of the notch 251 of the hanging ring 243 shown in FIG. 38. A notch 252 that is bent in an S shape is formed in the hanging ring 243 shown in FIG. 39A. A notch 253 that is bent in a Z shape is formed in the hanging ring 243 shown in FIG. 39B. Due to this notch 252 or 253, the hanging ring 243 is formed with a first arm segment 243a1 and a second arm segment 243a2.

Figure 40A:
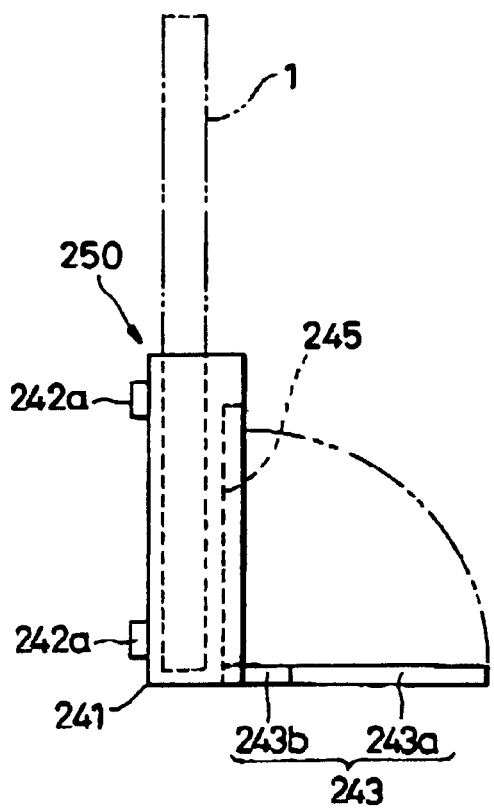
FIG. 40 shows the twenty-third embodiment of the card-like electronic appliance holder according to the present invention, with FIG. 40A being a side view of a state where the hanging ring has been raised to become a stand and FIG. 40B being a cross-sectional explanatory drawing in which the main parts shown in FIG. 40A have been enlarged.
Figure 40B:
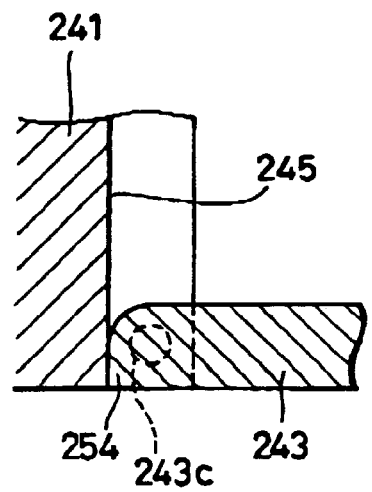

A card-like electronic appliance holder 250 according to a twenty-third embodiment of the present invention shown in FIG. 38 can be used as shown in FIGS. 40A and 40B in bookstand-like state when the holder main body 241 is upright. This feature is the same as the card-like electronic appliance holder 100 according to the tenth embodiment of the present invention that is shown in FIG. 12 and described earlier in the specification.

FIGS. 41A and 41B show how the card-like electronic appliance support apparatus 130 is used. The card-like electronic appliance support apparatus 130 is used by placing the card-like electronic appliance support apparatus 130 on a horizontal or approximately horizontal support surface 145, and hanging a desired number of card-like electronic appliance holders 210 to 250 from the suspended part 131a.

Figure 42:
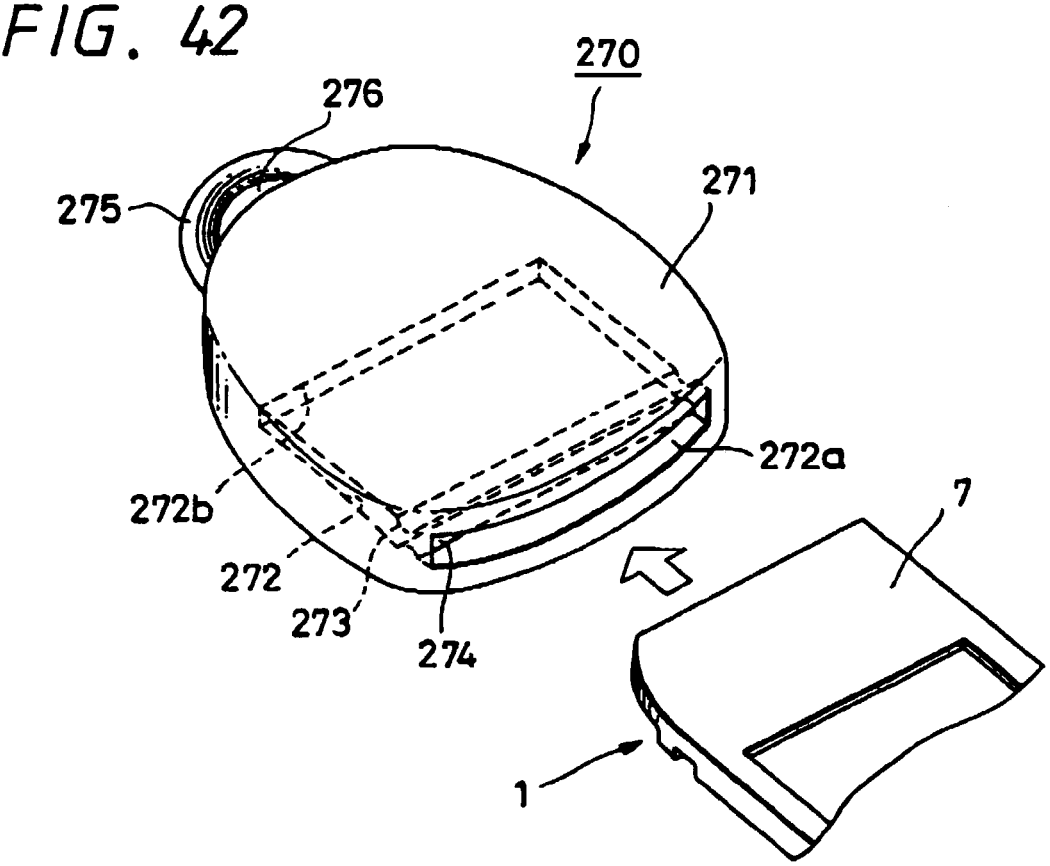
FIG. 42 shows a twenty-fourth embodiment of a card-like electronic appliance holder according to the present invention, and is a perspective view showing the state of the holder before a card-like electronic appliance is attached.
Figure 43A:
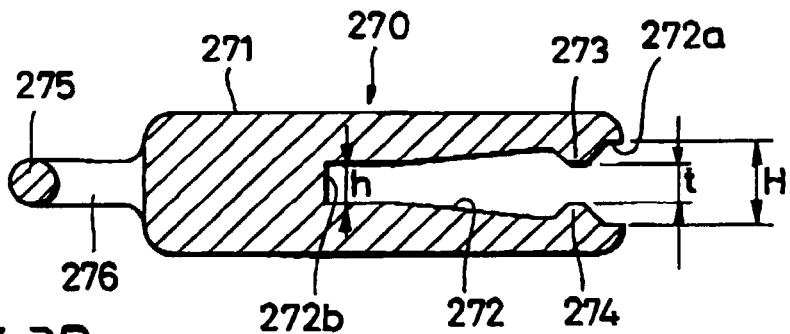
FIG. 43 shows the twenty-fourth embodiment of the card-like electronic appliance holder according to the present invention, with FIG. 43A being a vertical cross-sectional view of the central part and FIG. 43B being a vertical cross-sectional view of the central part in a state where a card-like electronic appliance has been attached.
Figure 43B:
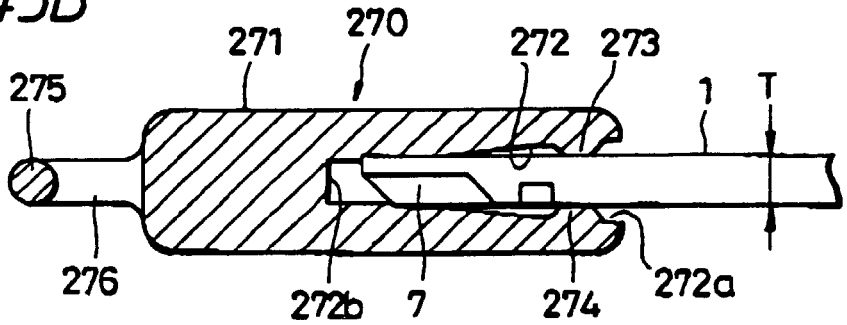

A card-like electronic appliance holder 270 according to a twenty-fourth embodiment of the present invention is shown in FIGS. 42, 43A, and 43B, and has a pair of rib parts 273, 274 formed in an opening 272a of an appliance insertion hole 272 provided in a holder main body 271 so as to hold the external case 2 of the semiconductor storage medium 1 more tightly.

The holder main body 271 is composed of a rounded, flattened case, and has an opening 272a for the appliance insertion hole 272 provided in one side surface and an approximately semicircular holder 275 provided on the opposite side. The opening formed on the inside of the holder 275 is the through-hole 276. The appliance insertion hole 272 is formed so that the height H (in the thickness direction of the inserted semiconductor storage medium 1) of the opening 272a is set larger than the height h of the base part 272b and the thickness T of the semiconductor storage medium 1 (H>T>h).

The opening 272a and base part 272b of the appliance insertion hole 272 are linked by gradually sloping surfaces, so that the terminal part 7 of the semiconductor storage medium 1 can be easily inserted and removed. It should be noted that the height h of the base part of the appliance insertion hole 272 may be equal to thickness T of the semiconductor storage medium 1 (T=h).

Two rib parts 273, 274 that extend in the direction in which the opening 272a extends are formed in the upper and lower surfaces of the opening 272a of the appliance insertion hole 272. Each of these rib parts 273 and 274 is continuously formed from one side surface to the other. The gap t between the rib parts 273, 274 is set smaller than the thickness T of the semiconductor storage medium 1 (t<T).

With the card-like electronic appliance holder 270 according to the twenty-fourth embodiment, when a semiconductor storage medium 1 is inserted into the appliance insertion hole 272, the top and bottom rib parts 273, 274 tightly hold to the top and bottom surfaces of the external case 2, thereby closing the gap at the opening 272a. As a result, poor electrical connections that occur for the terminal part due to dust and dirt, etc., entering the appliance insertion hole 272 and corrosion of the terminal part or memory damage due to moisture entering the appliance insertion hole 272 can be prevented.

It should be noted that the gap between the rib parts 273, 274 only needs to be at least equal to the thickness T of the semiconductor storage medium 1. Also, the rib parts 273, 274 only need to be provided on one side, in which case the same effect as the present embodiment can be obtained.

Figure 44A:
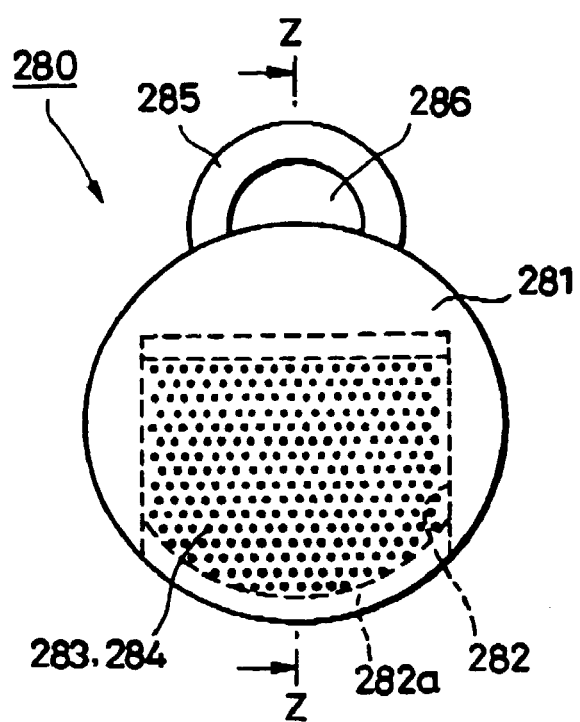
FIG. 44 shows a twenty-fifth embodiment of a card-like electronic appliance holder according to the present invention, with FIG. 44A being a frontal view and FIG. 44B being a bottom view.
Figure 44B:
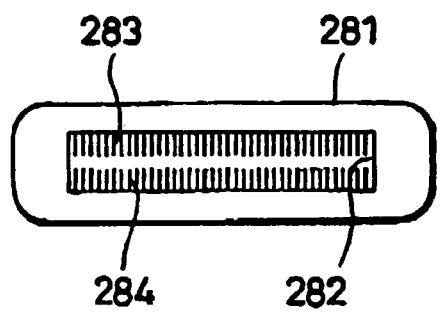
Figure 45:
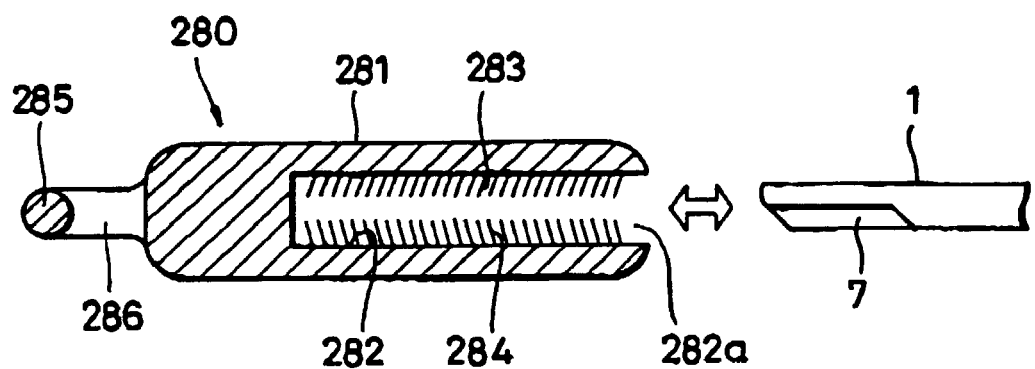
FIG. 45 shows the twenty-fifth embodiment of the card-like electronic appliance holder according to the present invention, and is a vertical cross-sectional view of the central part in a state before a card-like electronic appliance is attached.

A card-like electronic appliance holder 280 according to a twenty-fifth embodiment of the present invention is shown in FIGS. 44A, 44B, and 45 and has a pair of sweeping members 283, 284, which sweep the terminal part 7 of the semiconductor storage medium 1 that is inserted and removed, provided in the inside of the appliance insertion hole 282 in the holder main body 281.

The holder main body 281 is a case in the shape of a flat disc (though the case may be in a rectangular shape, an oval shape, or any of the shapes mentioned earlier in this specification), and has an opening 282a for the appliance insertion hole 282 formed in one side surface and an approximately semicircular holder 285 formed at the opposite side. The opening formed on the inside of the holder 285 is the through-hole 286.

The two sweeping members 283, 284, are composed of brushes that have a large number of hair-like protrusions. As shown in the drawings, it is preferable for the sweeping members 283, 284 to be tilted towards the inside, though the sweeping members 283, 284 may alternatively be set vertically. These sweeping members 283, 284 composed of brushes can be made by attaching the bristles of an antistatic brush using an adhesive, by integrally forming the sweeping members 283, 284 as part of the holder main body 281 using injection molding, or by another method.

With the card-like electronic appliance holder 280 according to the twenty-fifth embodiment, when a semiconductor storage medium 1 is inserted into the appliance insertion hole 282, the pair of sweeping members 283, 284 elastically squeeze the semiconductor storage medium 1, with the semiconductor storage medium 1 being held by this squeezing force. When the semiconductor storage medium 1 is inserted and removed, the brushes touch the terminal part 7, so that the terminal part 7 is cleaned by the sweeping members 283, 284 and dust and dirt that adhere to the terminal part 7 can be swept away.

The sweeping members 283, 284 and/or the holder main body 281 can be formed with a coating of a fluororesin. In this case, the fluororesin coating can suppress and prevent moisture from adhering, and can repel any moisture that adheres to the terminal part 7 when the semiconductor storage medium 1 is inserted. Accordingly, an anti-moisture effect is obtained whereby it is possible to suppress and prevent moisture from adhering to the terminal part 7 inside the appliance insertion hole 282 and to prevent damage to the memory that is caused by moisture adhering to the terminal part 7.

It should be noted that a perfluoro polyether (PFPE), for example, can be preferably used as the material for the fluororesin coating, though other fluororesins, such as polytetrafluoroethylene (PTFE) and a tetrafluoroethylene-hexafluoroethylene copolymer (FEP), may be used.

Figure 46A:
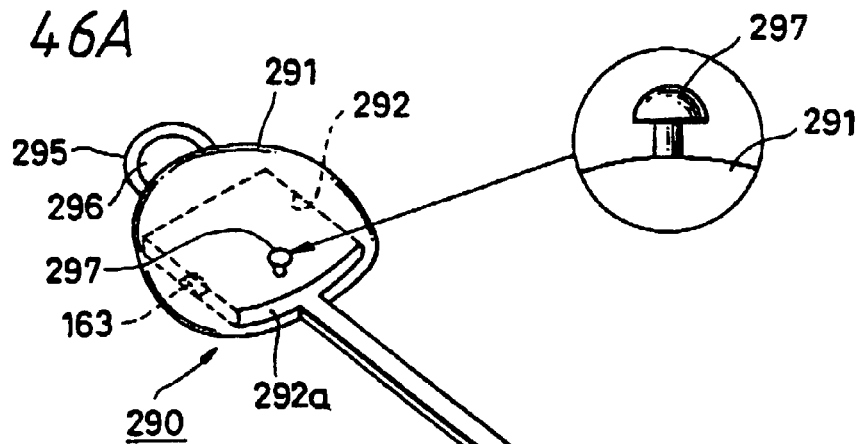
FIG. 46 shows a twenty-sixth embodiment of a card-like electronic appliance holder according to the present invention, with FIG. 46A being a perspective view, FIG. 46B being a perspective view of a state where a card-like electronic appliance has been attached, and FIG. 46C being a perspective view of a state where a card-like electronic appliance is held by a band member.
Figure 46B:
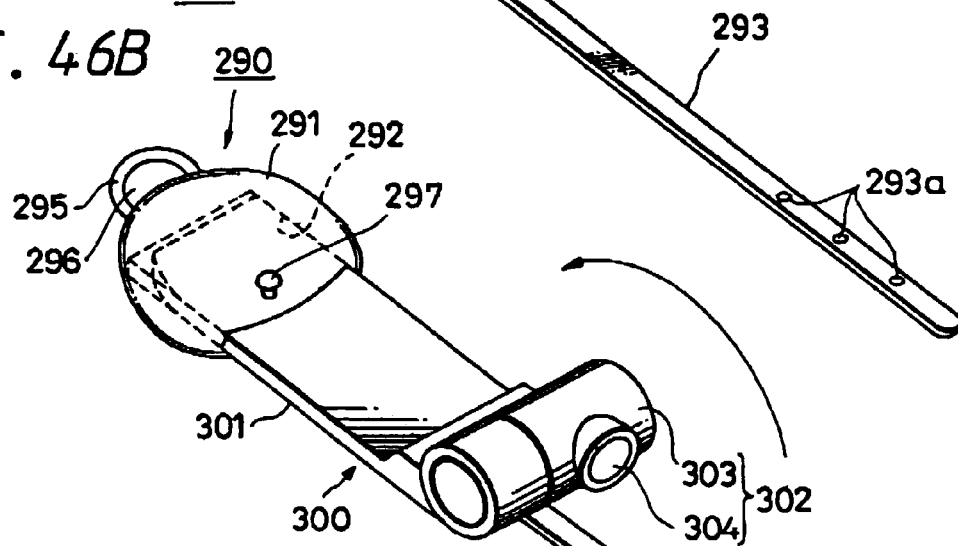
Figure 46C:
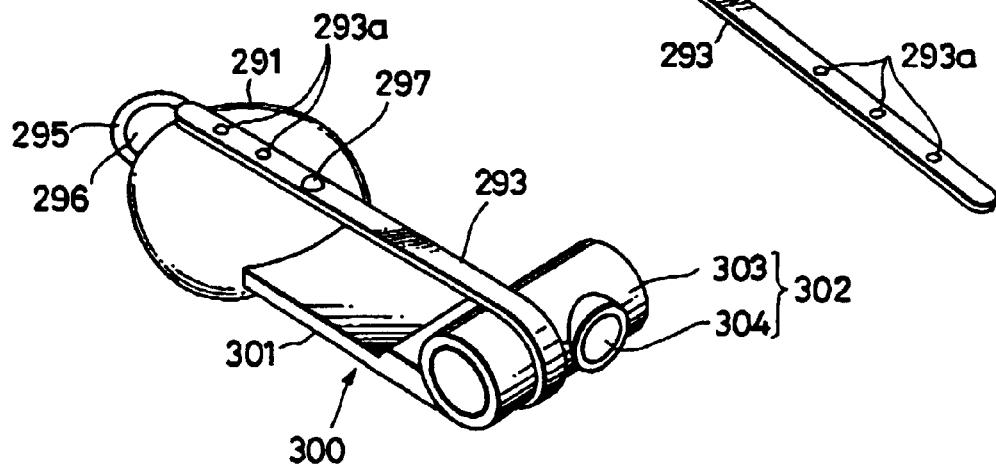

A card-like electronic appliance holder 290 according to the twenty-sixth embodiment of the present invention is shown in FIGS. 46A, 46B, and 46C, and has a band member 293 for holding a card-like electronic appliance integrally formed with the holder main body 291.

The holder main body 291 is in the shape of a flat, rounded case, and has an opening 292a for the appliance insertion hole 292 formed in one side surface, and a convex part 163 for engaging and holding the semiconductor storage medium 1 formed at a predetermined position inside the appliance insertion hole 292. A holder 295 that is approximately semicircular is also provided on the opposite side of the opening 292a of the holder main body 291. The opening formed on the inside of the holder 295 is the through-hole 296.

The band member 293 is composed of a long, slim bar-like member that exhibits elasticity, with one end of the band member 293 being connected to and integrally formed with an approximately central part of the opening part 292a of the holder main body 291. At the other end of the band member 293, a suitable number of engagement holes 293a are provided at suitable intervals, and an engagement pin 297 for engaging an engagement hole is provided on the holder main body 291. The engagement pin 297 is mushroom-shaped with a cap part that acts as a stopper, and is disposed on the other side of the opening part 292a close to an opposite edge to the edge where the base part of the band member 293 is fixed.

A holder 290 with this kind of band member 293 is effective for holding the type of card-like electronic appliance shown in FIGS. 46B and 46C, for example, with the effects of this embodiment being favorably achieved in this case. The card-like electronic appliance shown in these drawings belongs to the category of devices usually referred to as "expansion modules", and is a device called a "camera module" that is equipped with a lens and a charge-coupled device (CCD).

Here, the expression "expansion module" refers to an electronic appliance that can be attached to a card slot provided for hardware appliances and whose terminals have the same form as a card-like electronic appliance such as a Memory Stick. Apart from the camera module mentioned above, other examples of such expansion modules are given below.

Examples of expansion modules include a Bluetooth module that is equipped with a Bluetooth antenna, a GPS (Global Positioning System) antenna that is equipped with a GPS antenna, a LAN (Local Area Network) module that is equipped with a LAN antenna, a microphone module that is equipped with the mike part of a microphone, and a fingerprint checking module that is equipped with a fingerprint checking unit.

The camera module 300 that is a specific example of a card-like electronic appliance shown in FIGS. 46B and 46C has terminals in the same form as the terminal part 7 of the semiconductor storage medium 1 described above, and is integrally provided with a lens and a CCD at an opposite end to the terminal part.

In more detail, the camera module 300 is provided with an external case 301 and a camera unit 302 that is disposed at one end of the external case 301 in the longitudinal direction. The external case 301 is formed so as to be integrally combined with the camera unit 302 at one end in the longitudinal direction, with a terminal part 7 being disposed at the opposite end part to the camera unit 302.

The camera unit 302 includes a camera case 303 that is provided at one end of the external case 301, an objective lens 304 that is attached to the camera case 303 and is exposed to the outside, a CCD that is enclosed within the camera case 303, a processing apparatus for processing the image signal supplied from the CCD and outputting a signal corresponding to the image, etc.

The camera module 300 is heavier than a memory card that is described above as the semiconductor storage medium 1, and does not have a regular shape, so that the center of gravity is located on the side with the camera unit 302. Accordingly, when the camera module 300 is held by a card-like electronic appliance holder without the band member 293, the weight of the camera module 300 makes it easy for the module 300 to come out of the holder, so that there is the risk of the module coming out under its own weight.

In the present embodiment, the camera module is held in the card-like electronic appliance holder 290 using the band member 293, so that even a heavy expansion module can be reliably held and it can be ensured that the camera module 300 will not fall out under its own weight. FIG. 46C shows how the present card-like electronic appliance holder 290 is used.

After the terminal side of the camera module 300 has been inserted into the appliance insertion hole 292 of the card-like electronic appliance holder 290, the band member 293 is bent around the outside of the camera module 300 and an appropriate hole, out of the plurality of engagement holes 293a provided in the end of the band member 293, is made to engage the engagement pin 297. In this way, the camera module 300 is prevented from falling out under its own weight and can be securely and reliably held.

By including an anti-static agent in the material used for each of the card-like electronic appliance holders 20 to 290 that are described above, the build up of static electricity can be prevented for the holder main bodies 21 to 291, so that static electricity can be prevented from causing electrostatic damage to the memory or other electronic components. As one example, a styrene copolymer can be used as this antistatic agent.

The present invention is not restricted to the embodiments that have been described above, so that, for example, while the descriptions have referred to the case where the present invention is used with Memory Sticks and modifications of such, it should be obvious that the present invention can also be used with other semiconductor storage media, such as small PC cards and Smart Media. The form, structure, and composition of the card-like electronic appliance holder and card-like electronic appliance support apparatus of the present invention are also not restricted to the examples described, so that a desired form and composition may be used, as may be a desired color.

INDUSTRIAL APPLICABILITY

As explained above, the card-like electronic appliance holder of the present invention can easily and reliably hold a card-like electronic appliance, and makes it difficult to lose such card-like electronic appliances, even when such appliances are kept separately. As a result, it is possible to provide a card-like electronic appliance holder that can store the terminal part of a card-like electronic appliance in an improved state, with dust, dirt, and moisture inside the appliance insertion hole being prevented or suppressed from entering the card-like electronic appliance, and problems such as dust and dirt, etc., adhering to the terminal part and moisture adhering to the terminal part and causing deterioration also being prevented.

With the card-like electronic appliance support apparatus according to the present invention, card-like electronic appliances can be kept in an organized fashion even when a high number of card-like electronic appliances are used. Each card-like electronic appliance can be easily and appropriately stored and managed, so that a card-like electronic appliance support apparatus that is suited to the organized storage of card-like electronic appliances can be provided.

What is claimed is:

1. A card-like electronic appliance holder, comprising:
    a holder main body having an appliance insertion hole adapted to receive at least part of a card-like electronic appliance when the card-like electronic appliance is in an assembled position therein, the appliance insertion hole having an upper surface, a lower surface, a pair of side surfaces and an opening providing access to the appliance insertion hole;
    the holder main body including a rib part disposed adjacent to the opening of the appliance insertion hole so that the rib part frictionally engages a surface of the card-like electronic appliance when the card-like electronic appliance is in the assembled position to thereby hold the card-like electronic appliance in the assembled position, the rib part being formed on the upper surface and the lower surface continuously from one of the pair of side surfaces to the other of the pair of side surfaces, whereby the rib part closes a gap between the appliance insertion hole and the card-like electronic appliance when the card-like electronic appliance is inserted in the assembled position.

2. A card-like electronic appliance holder according to claim 1, wherein the holder main body is formed of an elastomer or a plastic that includes an anti-static agent.

3. A card-like electronic appliance holder according to claim 1, wherein a surface of the holder main body has a coating of fluororesin for providing a waterproof layer.

4. A card-like electronic appliance holder, comprising:
    a holder main body having an appliance insertion hole adapted to receive at least part of a card-like electronic appliance when the card-like electronic appliance is in an assembled position therein;
    the holder main body including a plurality of deformable sweeping members disposed on opposing walls inside the appliance insertion hole for sweeping a connection part of the card-like electronic appliance when the card-like electronic appliance is inserted into, or removed from, the assembled position, the sweeping members frictionally engaging opposite surfaces of the card-like electronic appliance when the card-like electronic appliance is in the assembled position to thereby hold the card-like electronic appliance in the assembled position.

5. A card-like electronic appliance holder according to claim 4, wherein the sweeping members are brushes and the connection part is a terminal part provided, in a front end of the card-like electronic appliance in which a semiconductor memory is enclosed, and wherein one of the brushes sweeps a surface of the terminal part when the card-like electronic appliance is inserted in the appliance insertion hole.

6. A card-like electronic appliance holder according to claim 4, wherein the holder main body is formed of an elastomer or a plastic that includes an anti-static agent.

7. A card-like electronic appliance holder according to claim 4, wherein a surface of the holder main body has a coating of fluororesin for providing a waterproof layer.

8. A card-like electronic appliance holder, comprising:
    a holder main body having an appliance insertion hole adapted to receive at least part of a card-like electronic appliance when the card-like electronic appliance is in an assembled position therein;
    the holder main body including a deformable holding means for holding the card-like electronic appliance in the assembled position by wrapping around the card-like electronic appliance when the card-like electronic appliance is in the assembled position.

9. A card-like electronic appliance holder according to claim 8, wherein the holding means comprises:
    a deformable band member having two ends, one end being fixed to the holder main body, and the other end having an engagement hole; and
    an engagement part that is provided on the holder main body for insertion into the engagement hole of the band member.

10. A card-like electronic appliance holder according to claim 8, wherein the holder main body is formed of an elastomer or a plastic that includes an anti-static agent.

11. A card-like electronic appliance holder according to claim 8, wherein a surface of the holder main body has a coating of fluororesin for providing a waterproof layer.

* * * * *